United States Patent
Yates et al.

(10) Patent No.: US 6,330,586 B1
(45) Date of Patent: *Dec. 11, 2001

(54) RECONFIGURABLE SERVICE PROVISION VIA A COMMUNICATION NETWORK

(75) Inventors: Martin John Yates, Long Branch, NJ (US); Ian William Marshall; Julian Richard Hill, both of Ipswich (GB); Patrick Brian Farley, Long Branch, NJ (US); Mark Bagley, Ipswich (GB)

(73) Assignee: British Telecommunications Public Limited Company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,890
(22) PCT Filed: Feb. 7, 1996
(86) PCT No.: PCT/GB96/00252
§ 371 Date: Oct. 14, 1997
§ 102(e) Date: Oct. 14, 1997
(87) PCT Pub. No.: WO96/25012
PCT Pub. Date: Aug. 15, 1996

(30) Foreign Application Priority Data

Feb. 7, 1995 (EP) .................................................. 95300754
Apr. 24, 1995 (GB) .................................................. 9508283

(51) Int. Cl.[7] ....................................................... G06F 13/00
(52) U.S. Cl. ........................ 709/201; 709/202; 709/221; 709/227; 707/104
(58) Field of Search ................................... 709/201, 202, 709/203, 220, 221, 222, 223, 224, 226, 315, 217, 218, 227, 228, 311; 707/10, 103, 104

(56) References Cited

U.S. PATENT DOCUMENTS 4,611,094    9/1986    Asmuth et al. .

(List continued on next page.)

FOREIGN PATENT DOCUMENTS

WO A
8502510    6/1985    (WO) .

OTHER PUBLICATIONS

Eburne, "Intelligent Networks", Oct. 1992.

(List continued on next page.)

Primary Examiner—Viet D. Vu
(74) Attorney, Agent, or Firm—Nixon & Vanderhye P.C.

(57) ABSTRACT

A services provision system provides information services over one or more communications networks and has a software infrastructure divided into domains. Each domain has an intelligent software agent and this community of agents sits in a computing environment represented in each domain by a DPE kernel. The community of agents co-operates to provide service and service management functionality to a user. At least one of the agents is reconfigurable to change the functionality the system makes available. Reconfigurability is based on the use of a plurality of reusable software modules, the agent reconfiguring by selecting a new combination of modules. The software modules themselves incorporate rules, or policies, which determine process steps offered by the modules at run-time. These policies are external to the modules and may be loaded at run-time, allowing dynamic modification to functionality of the system. The system as a whole offers functionality associated with using services, providing them and managing them and the reconfigurability allows it to offer the different types of functionality in an efficient way. It also allows access control to functionality at different levels with particularly good security against fraudulent use.

29 Claims, 9 Drawing Sheets

U.S. PATENT DOCUMENTS

| | | | |
|---|---|---|---|
| 5,021,949 | * 6/1991 | Morten et al. | 395/200.61 |
| 5,335,346 | * 8/1994 | Fabbio | 711/163 |
| 5,396,543 | * 3/1995 | Beeson, Jr. et al. | 455/560 |
| 5,434,852 | * 7/1995 | Porta et al. | 370/385 |
| 5,528,677 | * 6/1996 | Butler et al. | 379/196 |
| 5,634,011 | * 5/1997 | Auerbach et al. | 395/200.72 |
| 5,664,170 | * 9/1997 | Taylor | 395/200.5 |
| 5,691,973 | * 11/1997 | Ramstrom et al. | 710/131 |
| 5,826,019 | * 10/1998 | Ronstrom | 709/201 |

OTHER PUBLICATIONS

Glynn, "Putting Thought Into Networks", IEE Review, Mar. 1994, pp. 67–70.

Sharp et al, "Advanced Intelligent Networks—Now a Reality", Electronics & Communication Engineering Journal, Jun. 1994, pp. 153–162.

Ericsson Review, vol. 70, No. 4, Stockholm Se, pp. 156–171, XP000415352 Söderberg: "Evolving an intelligent architecture for personal telecommunication", 1993.

IEEE Communications Magazine, vol. 29, No. 1, New York US, pp. 60–68, XP000203322 Maruyama et al.: "A concurrent object–oriented switching program in Chill", Jan. 1991.

International Switching Symposium, vol. 6, May 28, 1999, Stockholm Se, pp. 155–160, XP000130978 Skubic et al.: "Service management architecture".

IEICE Transactions, vol. E74, No. 11, Tokyo JP, pp. 3663–3671, XP000280947 Omiya et al.: "Service Creation and Execution Domain concept for the Intelligent Network", Nov. 1991.

* cited by examiner

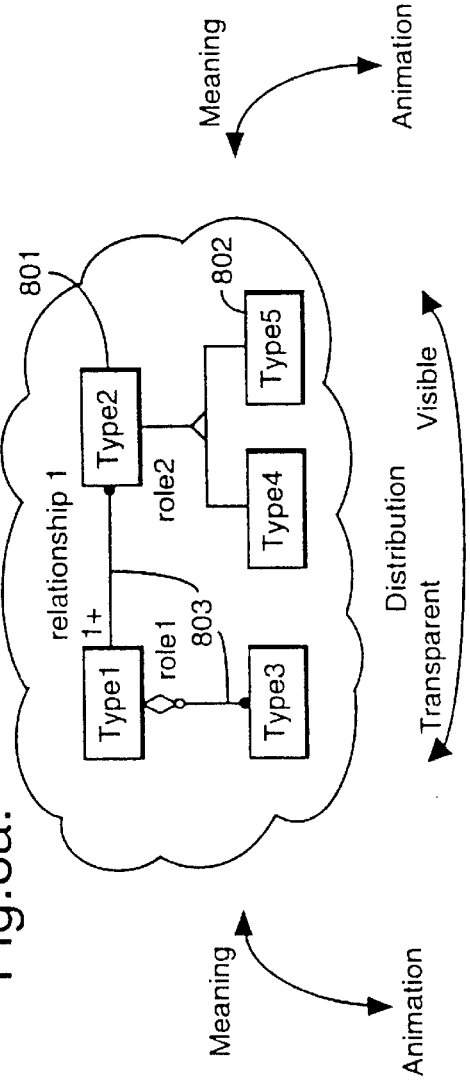
Fig.8a. Information viewpoint
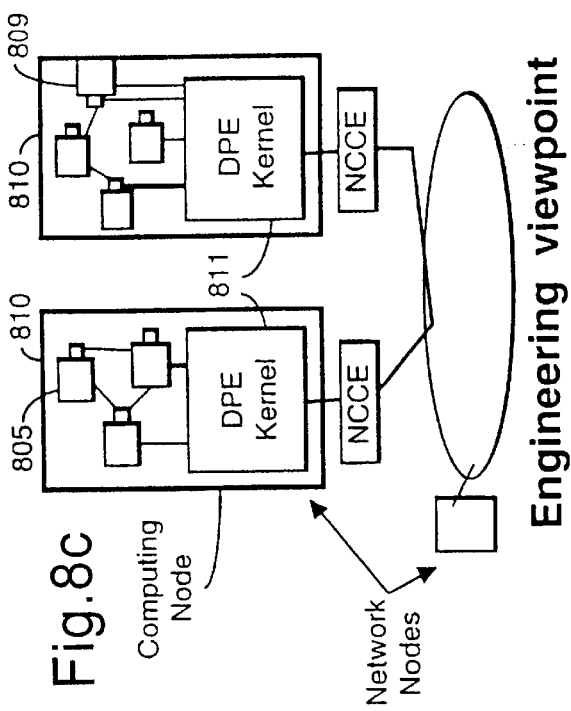
Fig.8c
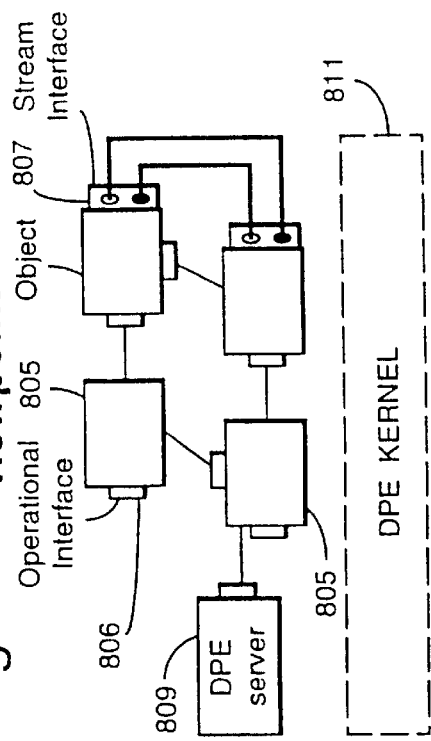
Fig.8b Computational viewpoint Structure of the DPE

RECONFIGURABLE SERVICE PROVISION VIA A COMMUNICATION NETWORK

BACKGROUND OF THE INVENTION

1. Field of the Invention

This invention relates to service provision by means of communications networks. It finds particular application in aspects such as access control, presentation of services to users and management of those services.

2. Related Art

Increasingly in the future, different types of services are likely to be offered over communications networks. For instance the increasing capability of technology is enabling a future where a wide variety of multimedia services can be delivered to users over communications networks. These services could include simple voice telephony, multimedia conference amongst many users, home shopping and video on demand. Additionally users may want such services to be delivered over a variety of terminal types such as a portable phone, portable personal computer and domestic television set with a set-top-box.

These services come not only from development of the telecommunications environment, including telephony and cable television, but also from environments previously separate, such as the computing environment. For instance, there has been major growth of computer network services, such as those available on Internet. Collectively all these services are referred to herein as information services.

Although to date (at least in the telephony world) the communication network operator and the service provider (SP) have generally coincided, this is not essential. Another trend expected in the future is that, increasingly, the service provider will be separate from the network operator. As in the case of Internet, several SPs (vendors) may offer their services (products) over a common network. Indeed, there may be further complexity involved in that the "common network" might in fact comprise multiple networks connected together, managed by many different network providers.

In circumstances where many different services, supplied by multiple vendors, are available over one, or multiple, communications networks, there is an opportunity for service brokers. Competitive advantage can be gained by such brokers by offering customers better services and more effective access arrangements to those services. Another name for the service broker is a service retailer.

In the light of this accelerating complexity in the world of communications, with many different entities being involved in the exploitation of a fast growing range of different services, there is a clear need for relatively sophisticated service provision and/or management systems.

SUMMARY OF THE INVENTION

According to a first aspect of the present invention, there is provided a service provision system, for making information services available by means of one or more communications network(s), wherein the service provision system comprises intelligent software agents in a computing environment, which agents co-operate to provide access to services for a system user, at least one of the agents being reconfigurable to modify functionality of the system available to the user.

By incorporating a reconfigurable software agent in this way, a service provision system can tailor access appropriately for users having different roles and needs in relation to the system. A user in this context might for example be a customer, needing to be able to request or use a service, a service provider needing to amend parameters of a service, or a retailer needing to add a new service to a portfolio. Further, a customer might not be an entity who actually uses a service, but could be responsible for arranging provision and payment for a service which someone else actually uses. Then again, a user might be (or represent) another piece of equipment rather than being (or representing) a person.

An example of the way functionality of the system might need to be modified is where a user of the system could identify themselves as being a customer, a service provider or a service retailer. A customer might need to be able to request use of a service, which the service provider role would not need, but the system would generally need to be able to bar the customer for security reasons from at least some of the functionality available to a service or network provider. Hence the functionality of the system might need to include service prompts to the customer but not to the network provider, and might need to apply different authentification checks to the service provider and to the customer.

It is recognised that computing infrastructures in telecommunications can become extremely complex and this could potentially limit manageability, extendibility, scalability and robustness. The approach exploited in embodiments of the present invention, which provides simplicity in the infrastructure, is that of intelligent agent technology, the basis of which is described in "Distributed Artificial Intelligence", ed. Huhns M. N., Pitman, London 1987. An intelligent agent in this context can be broadly described as a software based entity which acts on behalf of another entity. It might comprise updatable data, which might only be locally relevant, and usually some sort of negotiating or decision-making functionality. A community of agents can then perform negotiation tasks amongst themselves to decide a way forward on behalf of multiple entities in a distributed system.

The service provision system might preferably be structured in domains relevant to different entities in the system. For instance there might be at least a customer-related domain, based on a terminal used by the customer to access the system, and a service provider/retailer domain. Alternatively, there may be separate domains for the service provider and retailer.

In embodiments of the present invention, the software agents might sit in respective domains. A reconfigurable agent might appropriately sit in a service retailer domain, giving access to services and service-related infrastructure on behalf of the service retailer.

The "portfolio" of available configurations might preferably include a configuration for use by a user who does not or cannot disclose an identity to the system. Such a configuration would generally include the facility of payment, either actual or guaranteed in some way, in advance of a service being provided.

A reconfigurable software agent may comprise, or have access to, a plurality of software modules, reconfigurability being provided at least in part by the agent taking selected sets of the software modules. Each software module is likely to comprise executable code, or code to be interpreted, which the agent invokes and runs as a process. A selected set of software modules invoked by the agent thus provides the run-time realisation of the service provision system, as determined by a particular agent configuration.

The software modules are preferably available to more than one agent configuration, making it possible to build a service provision system which is adaptable while re-using executable code. The system can also be designed so that upgrades are relatively simple to do, for instance by adding to or modifying the software modules.

Preferably, functionality of at least some of the software modules provides service-independent building blocks (SIBBS) for services to be provided by means of the system. "Services" in this context means information services a customer might want to access by means of the system, such as Video-on-Demand. Service independent building blocks are then pieces of software, generally incorporating data and functionality, which provide supporting operations that a customer would need in addition to the services themselves. Examples would be a "Help" facility or a "View-Charges" facility.

SIBBS can be compound, in that they provide a facility as a whole, or they can be even more generic in that they might provide for instance a data-read operation which forms part only of the functionality needed to operate a "View-Charges" facility.

The use of SIBBS allows the system to be particularly easy to upgrade for instance in the light of new services becoming desirable.

Many users will also require the service provision to confer an optimum level of effectiveness, performance and quality irrespective of their choice of terminal type or configuration, or network connection. Services may be provided by more than one communications network and, where a plurality of networks is involved, they may be of different types, such as mobile and fixed. Embodiments of the present invention can be used to optimise service provision over differing network platforms such as mobile cellular radio or fixed point connection despite different constraints such as restricted bandwidth on mobile networks.

This can be done by providing a type of software module (in addition to SIBBs) whose functionality provides adaptation of functionality of the service provision system, for instance to meet user-specific operating constraints or requirements. Thus the service provision system can for example respond appropriately whether a user is accessing the system by means of a telephone or a computer terminal, or according to the operating system of a user's terminal. Alternatively, an adaptation module, or "adaptor", might act as a filter or translator of information the system provides to the user, so that for instance technical data is filtered out of information provided to a non-technical user. An adaptor can also tailor the system to respond appropriately whichever service is required, and from which service provider, in the light of a service provider's or retailer's operational constraints. Again, for instance if there is a choice of network provider, there may be operational constraints associated with a particular network aspect.

"Adaptor" software modules of this type would thus contribute processes for establishing appropriate interfaces and protocols. The adaptors might either contain standards, interfaces and protocols as data, or might contain means for locating them.

As well as providing adaptation to operational constraints, the adaptors could provide other, related functionality. For instance, an adaptor might be provided which adapts the language in which a service is provided for a foreign user.

Adaptors are not essential but are useful in combination with SIBBs. If adaptors are not provided, an alternative would be to build their functionality into SIBBs. This however would be likely to increase the number of SIBBs significantly which can be disadvantageous in that complexity is also increased in the system.

Two types of software module are described above as potentially available to a reconfigurable agent; SIBBs and adaptors. A third type of software module which might usefully be provided, to control the reconfiguration process, is a coordinator module. This can be used to control selection and/or modification of software modules for each configuration. In particular, this module might provide conflict resolution and/or prioritisation for sorting out conflicts in functionality of the other modules in an agent configuration.

According to a second aspect of the present invention, there is provided a service provision system, for making information services available by means of one or more communications network(s), wherein:

(i) the service provision- system comprises software infrastructure arranged in domains, each domain providing functionality and data relevant to a respective aspect of service provision, and each domain comprising an intelligent software agent;

ii) information services, and associated management functionality, can be provided to users by means of co-operative interaction between agents of different domains; and iii) at least one of the software agents is provided with an available set of software elements, each element comprising service independent data and functionality but elements of the set in combination supporting specific services, such that the agent can enable provision of a first service by activating a first combination of elements from said set, and can enable provision of a second, different service by activating a second, different combination of elements from said set.

"Enable" in this context might mean for instance that the agent allows access to a service, to a user of the service provision system. Alternatively, the agent might provide some functionality which supports the service itself, such as a billing or charging operation.

The domains represent the division of the service provision infrastructure into areas relevant to the various entities involved. Each domain will provide functionality its relevant entity requires. For instance, the user will need at least to identify themselves and the constraints and facilities (eg facsimile versus a telephone) of their equipment need to be identified. This is done via the terminal domain. A service provider needs to be able to access the content of a service, for instance to update text, and might need to be able to bill for a service. This is done via a service provider domain. A service retailer needs to be able to run a service in their own environment and will need therefore the capability of loading/initiating a service and controlling a customer interface in terms of quality of service and, again, billing. This will be done via a service retailer domain.

In practice, the service retailer and provider domains might be the same domain since the functionality needed by the two roles might coincide. For instance, whether the service provider bills the customer or the service retailer does will be question of the commercial arrangements between them on a case by case basis.

Agents in the terminal and service provider/retailer domains may co-operate in use of the system to give appropriate access to a user to an information service or to associated management functionality.

There may be any number of domains as long as there are at least two. In practice the number will probably be kept low to avoid complexity. It will usually be an agent in the service retailer domain or equivalent, as well as or instead of other agents of the system, which is provided with the available set of software elements.

Agents of the system may have access to the same set of software elements, or to a partly shared set.

Software clearly provides the basis of the infrastructures needed in service provision systems according to embodiments of the present invention to implement scalable and deployable solutions. Different types of software technology might be employed, and there are several functional design approaches which could be used. However, a common approach to the design and implementation of software systems in this technical environment uses object oriented software technology. This is known and used by international standards bodies (e.g. Open Software Foundation Object Management Group (OSF OMG), Open Systems Interconnection (OSI)). Reference might be made for example to "Object Management Architecture Guide", Revision 2.0, Second Edition, Sep. 1, 1992. OMG reference: OMG TC Document 92.11.1.

In general terms, "objects" in this context comprise units of software which represent entities or concepts of the real world by means of a combination of data and functionality. Data is encapsulated as internal attributes of an object and the associated functionality is encapsulated as methods which use or operate upon the attributes. Although an object may receive a message from another object requesting it to perform a method on its attributes which may result in the return of data, the attributes themselves are not directly accessible by external objects. Such high degrees of encapsulation have not been readily available in earlier software technologies.

Embodiments of the present invention are advantageously based on object-oriented technology. For instance, in embodiments according to the present invention, the software agents may each comprise a set of objects and a way in which an agent can achieve reconfigurability might then be to change objects of its set, either altering individual objects or adding, subtracting or replacing objects in the set.

Each software module referred to above, whether a SIBB, an adaptor or a coordinator, may be an object. This can offer a particularly flexible way of achieving reconfiguration. It is possible to control behaviour of an object in response to circumstances by the use of rules expressed as policies. Reconfiguration can be achieved by modifying or substituting policies of objects in an agent. In embodiments of the present invention, a particularly flexible use of policies is to design policies to be external to the relevant object or objects, only being loaded at run-time of the object.

A co-ordinator module in an agent may control not just the set of software modules in a configuration of the agent, such as SIBBs and adaptors, but may also control a set of external policies available to them. Alternatively, an object might self-configure, seeking the correct policy or policies, once a relevant context has been established.

By designing a service provision system according to an embodiment of the present invention, there can be many advantages. One of these is security against unauthorised access. If the reconfigurable agent includes authentification capability, access functionality might simply not exist until an authentification step has been complied with. This is achieved by using an initial configuration of the agent which includes an authentification process but no access capability. The access capability is only brought into existence in a later, post-authentification configuration of the agent.

Other potential benefits of the access arrangements for an individual user might include the following:

single contact point for services from different vendors;

easy invocation and use of services from different vendors;

consistent presentation of services across different vendors;

integrated accounting and charging for a service set supplied by multiple vendors;

security from unauthorised invocation and use of services;

privacy from unauthorised access to service usage and service content information.

The customer base for information services is particularly wide. Initially it is anticipated to be particularly businesses, such as multinational corporations that have a range of fixed and mobile communication needs including electronic mail, voice and video conference. However, because of the growing installation of high capacity transmission links into domestic properties for entertainment services, and the growth of personal mobility, it is expected that the customer base will extend to the domestic market. Embodiments of the present invention can allow information service providers to scale their service management infrastructure accordingly.

From the perspective of the enterprises involved in satisfying the overall requirements of users there are likely to be major challenges involved in designing a suitable infrastructure. A potential starting point would clearly be provision of an architecture (from high-level design to low-level implementation) that can technically and economically support such information services. Software and hardware resources of the computing infra-structure would be enabling components of the information service architecture. An aspect of the computing infrastructure is the processing environment and a known environment of suitable type for use in embodiments of the present invention is the distributed processing environment (DPE) which allows multiple processes to be run using multiple computer "nodes". The DPE maintains a view of the multiple nodes and processes and handles message passing between nodes and objects, providing a common language for the exporting of interfaces for different objects residing on different nodes. That is, it assists with aspects of the software and hardware location transparency and facilitates the provision of scalable and deployable solutions. Standards for DPE already exist and are being extended.

A node in this context might conveniently be provided by a computer with processors and memory which is capable of running an operating system, compatible distributed processing platform and objects executed as processes on the computer.

In order to be commercially viable it is advantageous that an information services infrastructure responds rapidly and at low cost, and attractive characteristics would be that it is:

Flexible:
  to optimise use of resources by dynamic deployment and execution of software on the hardware infrastructure;

Extendible:
  to add and evolve functionality and capability to software and hardware;

Scalable:
  to cope with increasing numbers and dispersion of users and computing resources;

Reusable:
  to maximise software and hardware reuse and minimise cost of extending and scaling the architecture;

Adaptable:
to cope with changing, heterogeneous resources within and connected to the infrastructure;

Manageable:
to exert necessary control over operation and planned change in the infra-structure;

Robust:
to be fault tolerant and easily recoverable in the event of failure.

Architectures according to embodiments of the present invention can provide at least some, and may be able to provide all, of these characteristics.

Another advantageous characteristic would be that the communication network (or networks) itself is capable of transmitting a wide range of services. There are network technologies which are capable of supporting multiple service delivery and some examples of these are based on the asynchronous transfer mode (ATM) and synchronous digital hierarchy (SDH) technologies. A common feature of such networks is that they can use a range of transmission rates flexibly, choosing that most appropriate for the service being delivered.

Future information service retailing might be offered across a telecommunication information networking architecture that brings together elements of the multi-service network and DPE technologies mentioned. An example of such an architecture is that being defined by the TINA Consortium. Reference might be made to "Telecommunications Information Networking Architecture", Oshisanwo A., Boyd T., Proc. 4th IEEE Conf. Telecommunications, IEEE, London 1993.

As mentioned above, an important aspect of the computational infrastructure of the service retailer is the implementation of the access arrangements for users. According to embodiments of the present invention, the implementation of specific access arrangements supplied by the retailer can confer a number of capabilities for the benefit of users. These capabilities enable the user to:

enquire of the retailer the range and specifications of services sold;

negotiate a subscription to a service for the benefit of end-users;

view current details of existing service subscription such as usage permissions;

view historical details of existing subscriptions such as usage history and accrued charges;

enter a financial transaction to pay subscription accounts;

request assistance on any aspect of the retail environment;

supply their identity and undergo authentication procedure;

view and change their personal customisation preferences for each subscribed service.

These service provision capabilities can all be implemented using intelligent software agent technology.

BRIEF DESCRIPTION OF THE DRAWINGS

Embodiments of the present invention will now be described, by way of example only, with reference to the accompanying Figures in which:

FIGS. 8a, 8b, and 8c referred collectively as FIG. 8 show information, computational and engineering representations of a system architecture for use in designing embodiments of the present invention;

DETAILED DESCRIPTION OF EXEMPLARY EMBODIMENTS

Technical Context

Figure 1:
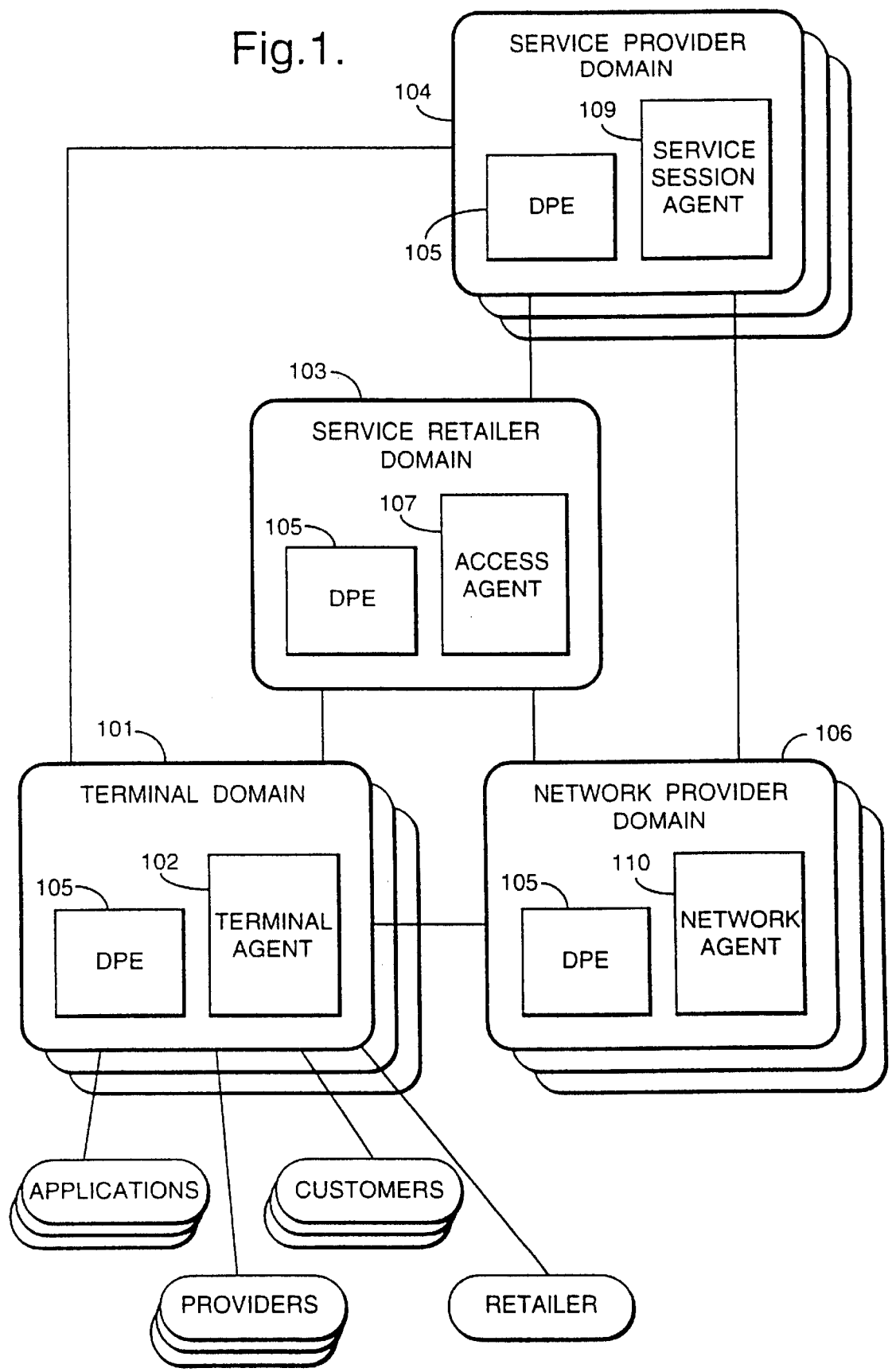
FIG. 1 shows schematically elements of a service provision system, according to an embodiment of the present invention, for providing services to users by means of communications networks.

As mentioned above, a suitable technical context for embodiments of the present invention would be an information networking architecture of the type defined by the Telecommunications Information Networking Architecture Consortium (TINA-C). Such an architecture is based on Open Distributed Processing (ODP) principles of object orientation and distribution, applied to telecommunications system design using Telecommunications Management Network (TMN) managed objects and Intelligent Network (IN) concepts for service management and control.

In a TINA-C architecture, there are three sets of concepts, a logical framework architecture, a service architecture, and a management architecture.

The logical framework architecture defines concepts and principles for the design of object-oriented software that operates in a distributed environment. Here a traditional layered computer architecture is defined, with computers and computer networks at the bottom, a distributed processing environment (DPE) in the middle, and (object-oriented) application software on top.

The application software is itself subject to organisation in TINA-C. The service architecture defines basic object types, and rules for their usage that can be used to design application software that provides services. A service is defined as a meaningful set of capabilities provided to a user. A service may have many users in different roles. For example, the end-user is the person who uses the service for its intended function, the service manager manages the service, and the network provider provides and manages the underlying resources required by a service. The notion of service in TINA-C applies to all applications that are accessible to users, including management services. The service architecture contains a call model suitable for a wide range of service types.

The management architecture defines object types, and rules for their usage, that can be used to design application software to manage services, networks and computing systems.

The (known) OMG type DPE core provides for communications between objects, provides dynamic bindings via a trader function and provides notification servers to give management information (such as faults, performance and the like). It provides generic "Application Programming Interfaces" (APIs) and message passing facilities. All application software is assumed to run on a DPE.

Available documentation, in addition to the reference given above, includes a set of deliverables, such as "O-O Modelling and Design", by J Rumbaugh et al, published by Prentice Hall in 1991, "Overall Architecture" TINA-C Deliverable 1994 by M Chapman et al and "Guidelines for the Definition of Managed Objects", published in "The Management of Telecommunications Networks" edited by R Smith et al and published by Ellis-Horwood in 1992.

System Design Techniques

Referring to FIGS. 8a–8c, to enable system design according to a TINA-C architecture, three ODP viewpoints can be selected, these being as follows:

Information: a viewpoint on a system that focuses on the semantics of information and information processing activities in the system.

Computational: a viewpoint on a system that focuses on the distributable software objects and their interactions.

Engineering: a viewpoint on a system that focuses on the deployment and distribution aspects of the system and on the infrastructure to support distribution.

For each of these, a set of modelling concepts are defined, providing a vocabulary that can be used to specify a system in the viewpoint addressed.

The information modelling concepts shown in FIG. 8a provide the framework for information specifications, describing the types 801, 802 of information used in a system and the activities that are performed on the information. An information specification describes the semantics of the problem domain that the application software is being designed for. For example, in a banking scenario an information model may contain objects such as account, debit, credit, and balance, and relationships such as debits plus credits equals balance.

The fundamental concepts of information modelling are objects, which are information bearing entities, object types 801, 802, that classify objects and define an object's characteristics in terms of attributes and operations that may be performed on objects, and relationships 803 that define links between, and aggregations of, objects.

Within TINA-C the notation chosen for information specifications is the ISO/IEC and ITU-T recommended GDMO (Guidelines for the Definition of Managed Objects) with GRM (General Relationship Model). GDMO is extensively used in the TMN community for information modelling and thus allows TINA-C to directly reuse this work. Rumbaugh's OMT (Object Management Tool) notation (described in "Object-Oriented Modelling and Design", by Rumbaugh et al, published by Prentice-Hall in 1991) is used for graphical representation of information specifications.

The computational modelling concepts shown in FIG. 8b provide the framework for computational specifications. A computational specification describes distributed telecommunications applications in terms of computational objects 805 interacting with each other. Computational objects are defined without any knowledge of where the computational objects will eventually be deployed i.e. distribution is made transparent. This allows for the specification of a software system that can tolerate the redeployment of software onto different nodes of a network without affecting the specification. The fundamental concepts of computational modelling are objects 805 and interfaces 806, 807. Objects are the units of programming, and encapsulation. Objects interact with each other by the sending and receiving of information to and from interfaces. An object may provide many interfaces, either of the same or different types. There are two forms of interface that an object may offer or use: operational interface 806 and stream interface 807. An operational interface 806 is one that has defined operations, that allow for functions of an offering (server) object 809 to be invoked by other (client) objects. An operation may have arguments and may return results. A stream interface 807 is one without operations (i.e. there is no notion of input/output parameters, requests, results, or notifications). The establishment of a stream between stream interfaces 807 allows for the passing of other structured information, such as video or voice bit streams.

A notation which might be chosen for computational specifications is TINA-C ODL (Object Definition Language), which is an enhancement of OMG IDL (Object Management Group Interface Definition Language). TINA-C has extended OMG IDL to allow for the definition of objects that have multiple interfaces and for the definition of stream interfaces.

The engineering modelling concepts shown in FIG. 8c provide the framework for engineering specifications. An engineering specification describes the deployment view of a system in terms of which computational objects 805, 809 are placed on what computing node 810.

It also defines the infrastructure to allow objects to execute and communicate with each other.

DPE and Hardware Context

Figure 9:
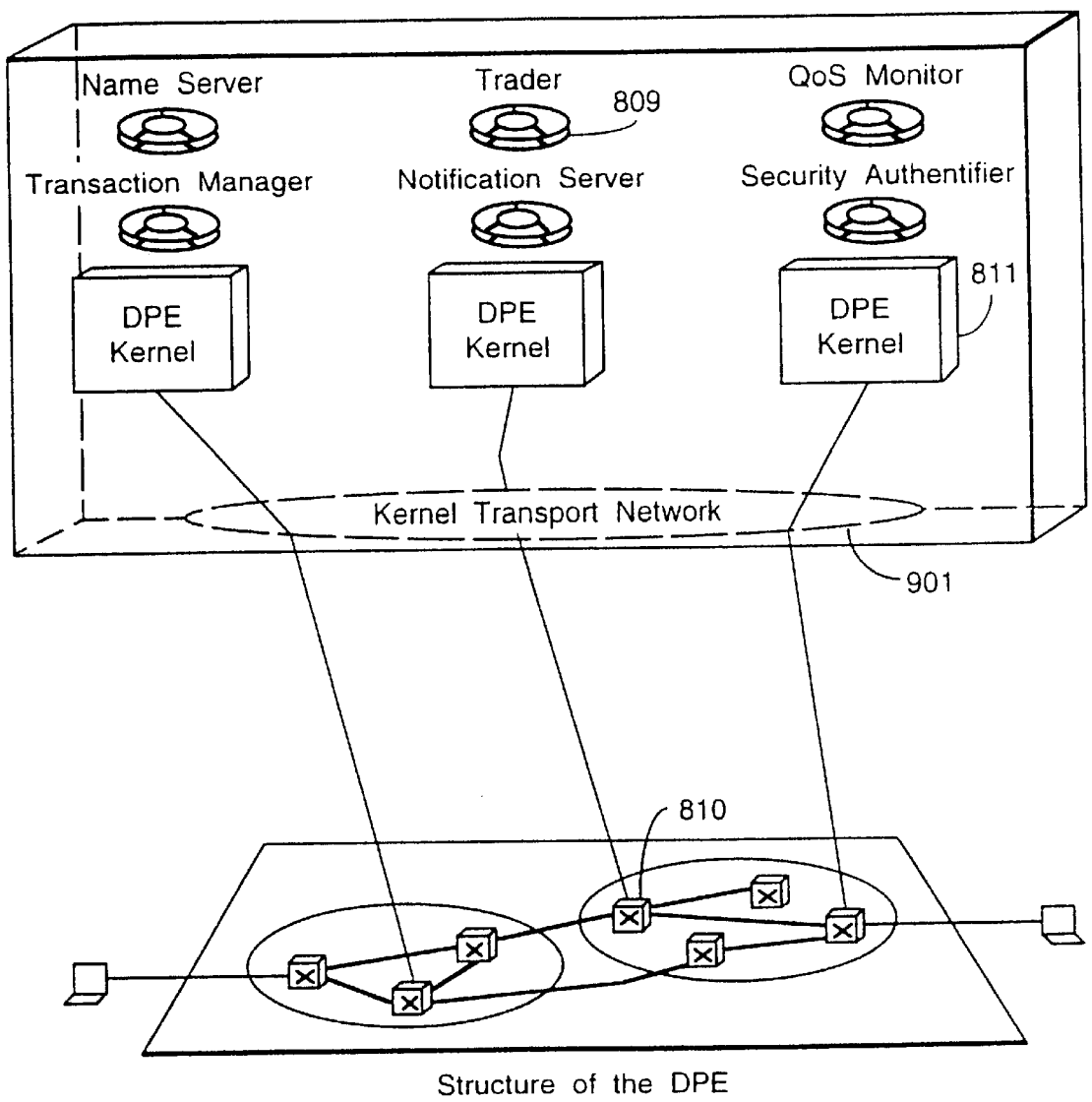
FIG. 9 shows the structure of a DPE relevant to FIG. 8.

Referring to FIG. 9, the infrastructure aspects of the engineering model will define the Distributed Processing Environment (DPE). As mentioned above the DPE is an infrastructure (of known type) that supports the interactions of computational objects. The DPE shields applications programs from the heterogeneous and distributed nature of the underlying environment, and provides the mechanism that allows objects to interact without knowing the computing nodes 810 they are on. The DPE defines four types of entity: DPE kernel 811, kernel transport network 901, DPE stubs, and DPE servers 809.

The DPE kernel defines a core set of communications, storage and processing capabilities (e.g., protocol stack). This core set is assumed to be present on each node.

The kernel transport network 901 is a communications network to which all DPE kernels are attached in order to exchange messages to facilitate object interaction. It is defined in order to logically separate the computing network from a transport network which is used for the transmission of voice and video. The logical separation recognises that the two networks may have different requirements on quality of service. However, they may both be implemented by the same physical network.

DPE stubs are software modules linked with computational objects which intercept interactions on objects, and use the underlying kernel transport network 901 to establish bindings and to transmit and receive invocation messages to and from remote objects. In practice, an interface for an object is designed and compiled. This generates a stub which will receive incoming messages to the object and select which operation is to be invoked by means of the interface.

DPE servers 809 provide infrastructure support. Two examples might be a trader and a notification server. A trader provides a run-time mechanism that allows objects to locate the interfaces of other objects. A notification server enables objects to emit notifications (i.e. significant events that occur during the lifetime of an object) to other objects. Objects wishing to receive notifications register at run-time with the notification server.

Figure 11:
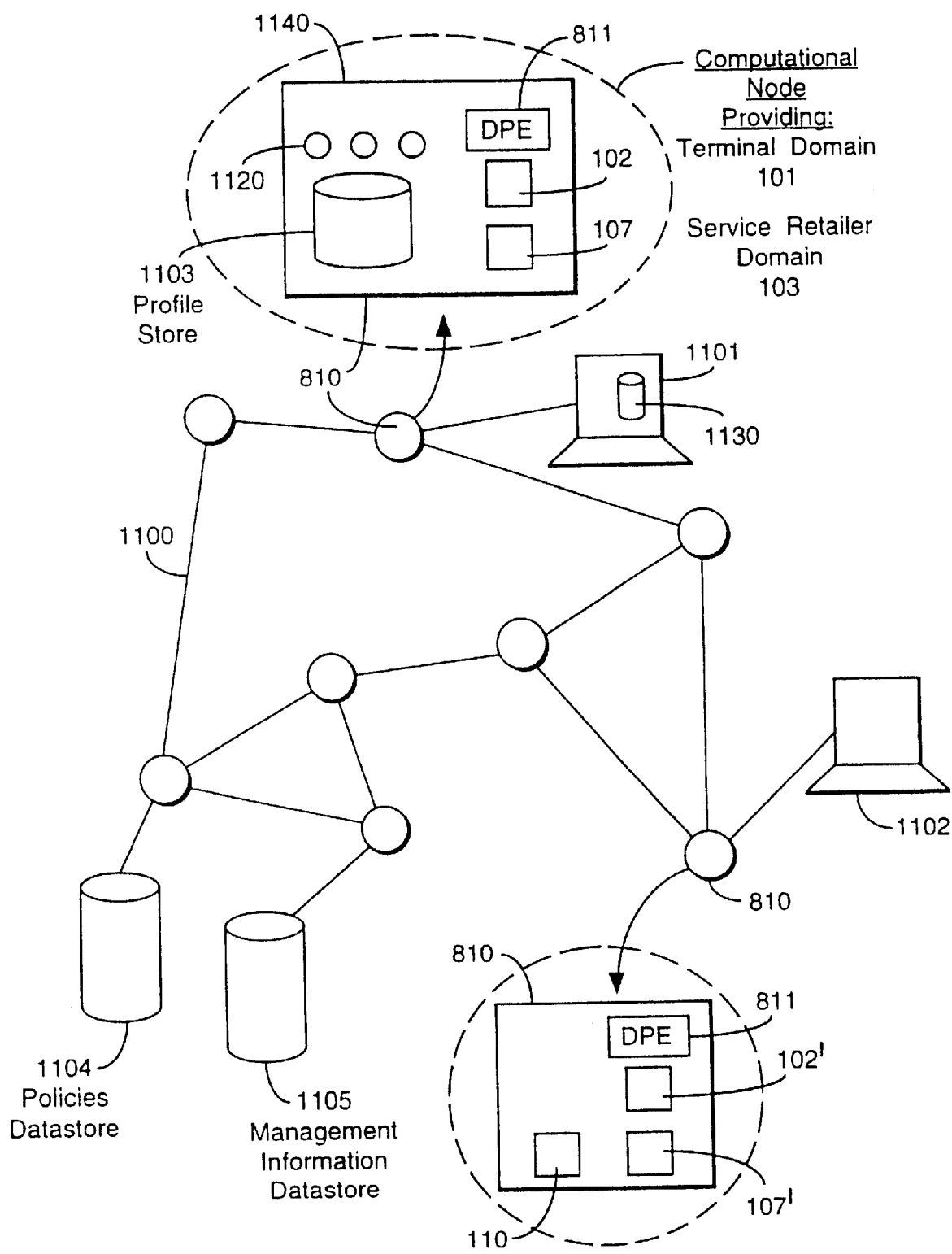
FIG. 11 shows a principally hardware view of platform for use in embodiments of the present invention.

Referring to FIG. 11, the hardware view of a system in which embodiments of the present invention might be built is based on a transport network 1100 which will carry for instance voice and data services, provided by service providers to users. The users will be connected to the network by different pieces of customer premises equipment (CPE) 1101, 1102. The various parties involved in offering and carrying those services, such as the service retailer, service provider and network provider, are also connected at computational nodes 801 to the transport network 1100. Intelligent software agents, for instance a terminal agent 102 and a user agent 107, will sit on either the same or different ones of computational nodes 801 connected to the transport network 1100.

As shown in FIG. 11, the terminal agent 102 and user agent 107 sit on the same computational node 801. These agents are provided with data of various types, including for instance user profiles in a user profile store 1103 which happens to share the computational node 801 with the user agent 107 and terminal agent 102. Other data stores available by means of the transport network 1100, as shown, include a policies data store 1104 and a management information data store 1105. The policies data store 1104, as further described below, allows a user access agent to reconfigure itself in order to change its response to user interactions. The management information data store 1105 may provide global management information in respect of services. Each computational node 801 is provided with a DPE kernel 811, and therefore a protocol stack for use according to DPE principles.

"Session" and "Access" Concepts

TINA-C systems make use of "session" concepts and "access concepts. These are as follows.

Session concepts define those objects and interfaces that are required to support the initiation of, interaction with, and termination of services. Although services by their nature are different from each other, they all have a common fundamental property in that they provide a context for relating activities. Such a context is termed a Session. As a generic definition, the term session represents a temporal period during which activities are carried out with the purpose of achieving a goal. Three types of session have been identified: service session, user session, and communications session.

A Service session is the single activation of a service. It relates the users of the service together so that they can interact with each other and share entities, such as documents or blackboards. A service session logically contains the service logic. A service session is computationally represented by a service session manager. A service session manager offers two types of operational interfaces. The first is a generic session control interface. This provides operations that allow users to join and leave a service. For certain services it may also offer operations to suspend and resume involvement in a service. The second type of interface will provide service specific operations, and will be dictated by the capabilities offered by the service logic.

The ability to suspend and resume involvement in a service is a desirable feature for some services. For example, consider a multi-media conference that occurs over several days. During the night, when the conference is not in use, it should be possible to release expensive communications resources. The service session can maintain state about the conference, such as the users and resources involved. Maintenance of state and the ability to suspend and resume involvement would avoid the need for tearing down and recreating the service each day.

A User session maintains state about a user's activities and the resources allocated for their involvement in a service session. Examples of state held in a user session include the user's accumulated charge, suspension and resumption history, and service specific state such as the current page being edited in a distributed document editing service, for example. When a user joins a service session, a user session is created. It is deleted when he leaves. The service session maintains links to the user sessions and thus provides a group oriented view.

A Communication session is a service oriented abstraction of connections in the transport network. A communication session maintains state about the connections of a particular service session, such as the communication paths, end-points and quality of service characteristic. A communication session is required only when stream between computational objects are required. Computationally a communication session manager provides the features of a communication session. It provides a connection graph interface of a service session to manipulate. A connection graph is an abstraction that defines concepts such as end-points and lines. A service session expresses connectivity requirements be adding, removing and linking end-points and lines. A service session manager will request connectivity between stream interfaces of computational objects. The communication session manger calls upon connection management objects to establish physical connections between the network access points of the relevant computing node, and nodal services that allow for a network access point to be connected to the software stream interface. Connection management components are not discussed further in this specification.

A user can be simultaneously involved in multiple service sessions. A service session has one or more users associated with it, and for each associated user there will be a related user session. A service session may have one or more communication sessions if the service involves stream communication. A communication session is related to exactly one service session.

The purpose of these separations is to decouple service oriented activities from connection oriented activities. Many types of services may exist in a future network and not all will require the explicit establishment of connections (streams). The service session is therefore a point of control for all service types, creating communication sessions when necessary.

Access concepts define those objects and interfaces that support user and terminal access to services.

Users need to have flexible access to services, in terms of the locations from which they access the service and the types of terminal they use. User access is therefore distinguished from terminal access. An agent concept is used in defining the TINA-C access model. An agent is this context is a computational object, or collection of objects, that acts on behalf of another entity.

A user agent represents and acts on behalf of a user. It receives requests from users to establish service sessions, or to join existing service sessions, and creates or negotiates with existing service sessions as appropriate. The creation of a service session by a user agent is subject to subscription and authentication checks. A user agent also receives and processes requests to join a service session from service sessions themselves. This is a form of in-coming call processing where another user has created a service session and invites the user to join in. User agents know the subscribed services that a user may create. This list can be presented to the user when the user logs onto his user agent.

A terminal agent is responsible for representing a terminal. It is responsible for obtaining the precise location of a terminal. Two examples are; the network access point a portable computer is attached to, and the cell in which a mobile phone is currently located.

In order to access a service, users must associate their user agents with terminal agents. This is part of a logging on process. A user may be simultaneously associated with many terminals. For example, in a video conference a user may be using both a workstation and a telephone. Similarly a terminal may be simultaneously associated with many users, for example, when in a meeting all users associated their user agents with the telephone in the meeting room.

User and terminal agents are computational objects that should have high reliability properties. These are required so that the network software can rely on a fixed point for locating users and terminals in an environment where both may be moving around.

Communication Access And Setup by Users

Figure 10:
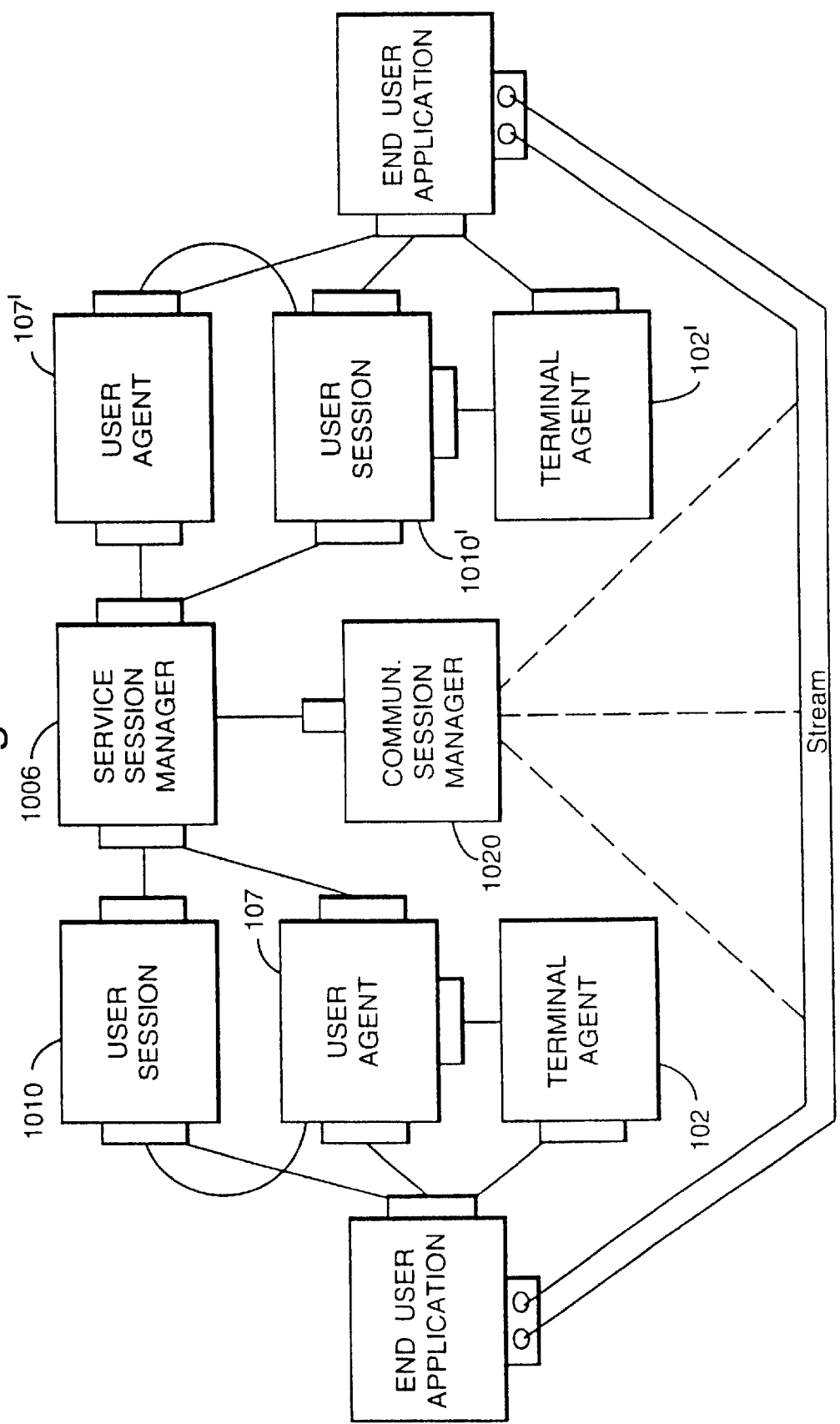
FIG. 10 shows a computational view of access and session concepts, by means of objects, in use of embodiments of the present invention.

FIG. 10 depicts a computational view of the access and the session concepts together. The shaded boxes of user and terminal agents 102, 107, represent service independent objects and the white boxes 107', 1006 depict service specific objects.

Referring to FIGS. 10 and 11, in an example, a user wishes to engage in voice communication with another user. First, the user selects a terminal on which he will access the network. Assume it is a workstation 1102 with window capabilities.

As part of a login procedure the terminal and user agents 102, 107 are found and associated with each other. The user is then presented with a menu of capabilities. He can make inputs to impose some local or global preferences. Where the terminal is a workstation, this will usually be by screen inputs but with other terminal equipment it may be for instance by means of a keypad or swipe card or the like. Any user inputs are passed to the terminal agent 102 which can act on, or add, information (such as CPE capabilities) to the inputs.

The user selects the voice call option. The terminal agent 102 passes the request to the user agent 107 to establish a voice call service session. The user agent 107 creates a voice call service session manager 1006, makes requests, passing on requirements which the user has set, and joins the user to the session, causing a user session 1010 to be created.

Another menu is presented to the user requesting the identification of the user to be called. On input of the data, the user agent 107 requests to the service session manager 1006 to join the new user into the session 1010. The service session manager 1006 uses the identity to locate the called user's user agent 107', and a request to join is passed over to the remote user agent 107'. The remote user agent 107' then alerts its associated terminal agent 102' of the incoming voice call.

The remote terminal agent 102' then alerts the called user's terminal 1101, by presenting a window on the user's terminal (for simplicity assume the user was already logged on). The called user accepts the call and a response is fed back to the service session manager 1006.

On seeing the acceptance, the service session manager 1006 first creates a user session 1010' of the new user and then requests a communication session manager 1007 to establish a connection between end-user applications residing on each of the users' terminals 1101, 1102 (the interface identities of which were passed over in an earlier request or response).

When the connection is established a response is passed back to the originating user. The two parties can then engage in voice conversation.

At any time either party may leave the session. This will result in the other user being notified and the deletion of the service session. During the voice conversation, subject to permission, each user may request another user to join the conversation. The user session 1010 can be used to record the duration of the call, and thus be used to calculate a total charge that can be added to the user's billing records, before termination of the service session.

In the above, the user has selected a voice call option. It is of course possible to select a more complex option, such as video conferencing. When the service session manager is created in response to a request for an option, the requests can be acted on by a factory component of the Service Session Manager 1006 to provide a customised version of a Service Session.

Subject to constraints imposed by the Service Session, the user may now have some level of control over the Service Session. For example, in a video conference the service session class may be set up to give chairman privileges to the first entrant. The User Agent 107 now has to ensure that the other participants in the conference are informed that they're in a conference in progress, with chairman priviledges to first entrant.

Each other user however will also have a measure of customisability and control via their own User Service Session 1010' interface. This interface allows them for instance to define the bandwidth of video windows that are not in use, or to define which video streams are to go to a set-top box or which to store via a Personal Computer. They are likely however to have only limited general control over conference conditions, such as how to gain the floor.

The User Service Sessions 1010, 1010' will inherit certain functionality associated with a conference such as the need for video and audio streams and a data stream. This is achieved by creating (via a factory) Connection Sessions managed by a Communication Session Manager 1020. As a result, streams in a conference can be potentially configured directly (e.g. choose not to send video), as part of the service (reduced bandwidth allocation to a channel not directly involved in the conference), or imposed by the User Agent 107 (e.g. to take advantage of low tariffs) or the Terminal Agent 102 (terminal capacity constraints).

The Communications Session Manager 1020 sets up Connection Sessions as required (including packet switched virtual connections for file transfer etc.).

Service Provision Using Reconfigurable Software Agents

The above indicates a technical context in which embodiments of the present invention could sit.

Referring to FIGS. 1 and 11, a service provision system according to an embodiment of the present invention comprises capabilities, expressed in a combination of hardware and software, which are structured in domains, these being as follows:

i) terminal domain, 101
ii) service retailer domain, 103
iii) service provider domain, 104
iv) communication network provider domain, 106

The domains represent typical areas of supply and management responsibility and will contain, or provide, data and functionality appropriate to their respective areas. Intelligent software agents sit in each one of the domains 101,103,104, 106. The agents are responsible in each case for representing a set of local resources, with respect to their particular domains, and they negotiate with each other for the best allocation of their collective resources to fulfil a service request.

Figure 3:
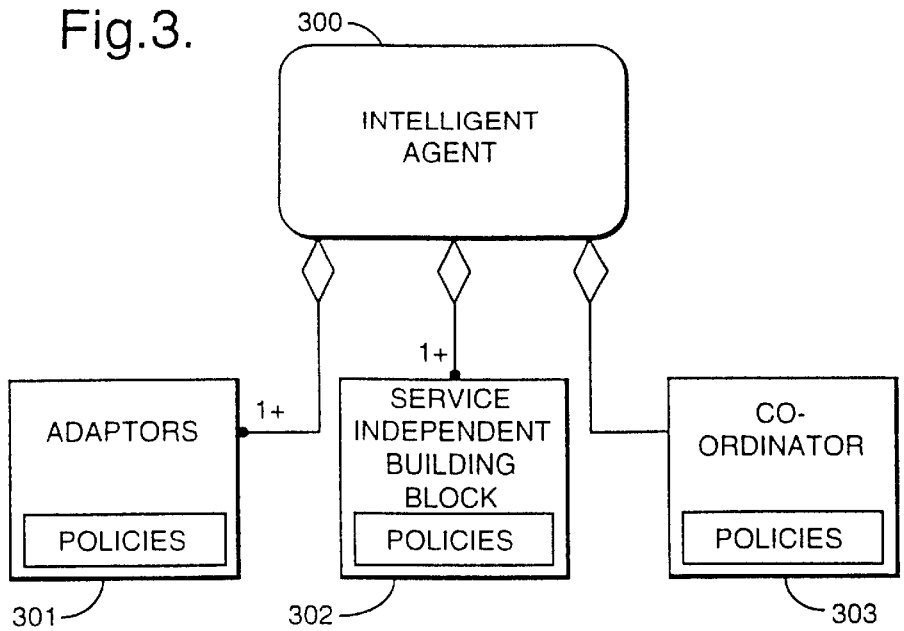
FIG. 3 shows schematically object types which an intelligent software agent of the system of FIG. 1 might comprise.

Communication between agents is handled by the DPE. This is embodied as a DPE kernel 105 residing in, and part of, the domains 101, 103, 104, 106. Message communication between the agents can then be handled by the DPE kernel. Referring also to FIG. 3, each agent is a computational object and therefore comprises data and functionality. Further, each agent comprises several component objects, or object types, 301, 302, 303. These component objects would usually be run on one or more of the computing nodes that are distributed on a communications network. The objects will be implemented by use of an object-oriented software language of which several suitable examples are readily available, such as C++. Policies for these objects can be implemented as data structures stored on computer memory devices 1104, which are interpreted by the component objects and can be dynamically updated.

Use of policies is known and described in written publications such as a special issue of JSAC on network management, Volume 11, No. 9, December 1993, by J D Moffett and M S Sloman.

Each agent uses local knowledge of its resource domain to offer the supply of those resources to other agents at agreed standards and specification. Any of the agents may supply and request resources.

Domains and Respective Agents

Anyone who needs access to the system, who may be a customer or end-user but may also be for instance a service provider or service retailer, interacts with the system via the terminal domain, 101, on which resides the Terminal Agent (TA), 102. A request for a service by a user would trigger interactions between the agents, each agent representing its own domain, which would then lead to a response to the user based on the outcome of those interactions.

The terminal domain 101 "contains" the user and items owned or controlled by the user, such as the user's personal profile and applications, and terminal. The Terminal Agent 102 is responsible for representing the terminal resources when interacting with agents in the retailer domain, 103, service provider domain, 104, and network provider domain, 106. The terminal resources normally include service applications (for example, an electronic mail editor), communication capabilities, and user-interface platforms. Typically the TA 102 will negotiate standards relating to its resources that include:

terminal resources
user interface capabilities (e.g. multimedia graphical user interface) p1 processing capacity;
memory devices;
communications ports and capabilities;
software operating systems;
applications specification and capabilities (e.g. video on demand);
network access point specification (e.g. type, capabilities)
other factors that would be relevant to optimising the service provision.

Looking at the service retailer domain 103, this represents the area of interest of the retailer who needs to:

facilitate access to information and communication services and associated tools act as middleman or broker for service providers or network providers offer customised guaranteed services to individual customers manage the services It contains an important agent, responsible for providing and managing the retail services to users and called here an Access Agent (AA) 107. This is a version of the "User Agent" described above in relation to a TINA-C architecture and hence the same reference numeral is used in the Figures.

In addition to agents, the service retailer domain 103 contains a set of management processes to allow facilities such as the following: to monitor activity, make configuration changes, specify and enforce policies, maintain quality, performance access etc. as demand and resources vary, enforce payment and security related mechanisms, assess interactions and add links to third parties, and advertise services. These management processes support the retail services provided and managed by the Access Agent 107, which services may be realised by resources supplied by the retailer such as billing, or may be realised by resources supplied by agents in the network or service provider domains.

Typically the AA 107 will negotiate standards for its resources that include cost, payment, quality of service (QoS), security, information content, functional content, format and control options and constraints.

Looking at the service provider domain 104, this represents the domain of interest of sources of the services which can be purchased in the retailer domain 103. It "contains" a set of disparate service providers, each of which can be represented by agents to negotiate with buyers in the retailer domain 103 on supply and payment for services, and similar issues. (It could be viewed as a specialisation of the retailer domain 103 with a restricted set of customers and offerings.)

The service provider domain 104 contains another important agent type, called here the Service Session Agent (SSA) 109, which represents the resources of an information service provider. In the usual mode of operation a SSA 109 supplies information services requested by an AA on behalf of the user. Typically the SSA 109 will negotiate standards for its resources that include cost, payment, QoS, security, information content, functional content, format, control options and constraints. The SSA 109 often will communication with agents in the network domain 106 for the supply of connection resources.

Looking at the network provider domain 106, this represents the domain of interest of the providers of the network used to convey messages e.g. from the user to the retailer or to other users. It therefore "contains" the network hardware and associated software, and connection control features to enable specific IN services. The user would not have a direct contractual relationship with the network provider which instead can be regarded as a sub-contractor to the retailer.

Another agent of importance is the Network Agent (NA) 110 which resides in the network provider domain and is responsible for representing network resources. The NA 110 will negotiate the allocation of network connections to deliver services provided by other agents. Typically the NA 110 negotiates standards for its resources that include cost, payment, connection addresses, bandwidth, QoS, mobility, priority, performance, quality, security and control options and constraints.

Referring particularly to FIG. 11, each of these domains can be supported by computational nodes 810 in a network. As shown, one computational node 810 carries both a terminal domain 101 and a service retailer domain 103.

These may alternatively reside on different nodes, or a further domain, such as a service provider domain 104, may additionally be resident on the same node 810.

Intelligent Agent Construction

Referring to FIG. 3, agents in embodiments of the present invention are particularly advantageous in their novel construction.

Embodiments of the present invention realise characteristics of information services provision such as extendibility, flexibility, scalability, reusability and manageability through the use of a plurality of distributed, co-operating intelligent agents, and by the novel construction of the intelligent agents involved. Each agent shows a design encapsulation that comprises several co-operating component objects. As mentioned above, the agent is constructed from a combination of three component object types 301, 302, 303 that may be added or removed dynamically. These component object types are:

i) service independent building blocks (SIBBs) 301;
ii) adaptors 302; and
iii) a co-ordinator 303.

These are described more fully below.

Policies

In embodiments of the present invention, functioning of a component object is determined by the set of operations programmed at compile time. Such operations act on the object itself and other objects in the system.

The execution of these operations is determined by the object reacting to incoming messages or internal triggers and responding according to the "system state". The system state is information held by objects and shared by inter-object communication. It is determined by the value of attributes in the object itself and those in other objects.

The operation of an object is fundamentally governed by rules (or policies). Policies are embodied as data and they control the task output of an object, the mode of achieving that output and the relationship of a component object with peer component objects. A very simple example of such a rule is:

"if {tests on system attributes give a recognised condition} then do (or do not) perform {operations} on {objects}"

In use of policies, they may be embedded in an object. In embodiments of the present invention however, it may be preferable that at least some policies are not embedded but loaded by the object during operation. The object instead has an embedded instruction to look for the policy, rather than having the policy itself embedded. The policy itself is then external to the object.

If it is desired to change behaviour of an object, one can:

1. change the system attributes. This might not be desirable because external attributes may also govern the behaviour of other objects which should not be changed:
2. change the values held in the object with which the system attributes are compared. This may provide the desired behaviour but could also result in other rules in the object misfiring;
3. change the test performed on the system attributes;
4. change which programmed operations are performed when a rule fires.

The concept of loading policies gives the flexibility of doing any of these dynamically during run time and the policies can be reused amongst many objects. For example suppose that a single object was replaced and the interactions of several objects should be changed to recognise the new one. This can be done fairly easily with external policies.

Known constructions, where policies are embedded in the objects, require rewriting of code in the object to change behaviour. External policies allow not only changes in behaviour to be achieved more easily but also more freely, and can allow extra behaviours (which are composed from combinations/permutations of a programmed set of operations) to be performed even if these were not originally anticipated.

The concept of policies is such that an object must have access to a 'Policy Interpreter'. This can be internal or external to the object. In order to locate policies, a policy server might be provided, again either internal or external to an object.

Co-ordinator

For each agent there is a single coordinator component object 303 that is responsible for managing the membership of the other component objects to the set that comprises the agent. The coordinator 303 uses a set of policies to ensure that member component objects can be used co-operatively, to resolve policy conflicts and to establish collective and inter-working policies for the whole component object set. (Collective policies are policies that are available to two or more component objects in the set.)

A co-ordinator 303 in this context might therefore be generally described as a software entity having at least selection and conflict resolution functionality. Examples of conflict that might be resolved by a coordinator include two objects which both have the instruction "never defer", and two objects which both need the same resource. The co-ordinator might modify an object to resolve the conflict, and might use collective policies to ensure no more than a certain proportion of the resource is used by any one of the objects.

The functions of the coordinator 303 might in practice be provided from more than one object, or distributed amongst objects with other functionality.

Service Independent Building Blocks

There are one or more service independent building blocks (SiBBs) that are responsible for the service management and service provision. SIBBs are units of both information and functionality that provide the services to other agents or users. A SIBB may use various low-level resources to deliver its service unit. It is the capability of embodiments of the present invention for flexible addition of SIBBs to an agent that contributes significantly to the extendibility, manageability and scalability of the information services infrastructure. SIBBs may be atomic or more usually compounded from sets of atomic SIBBs. For example in an AA the compound SIBB called Accounter, which gives subscribers an account enquiry, includes the atomic SIBBs data_locate, data_read. It is by the construction of SIBBs from atomic SIBBs that embodiments of the present invention achieve in part the reusability of the information services infrastructure.

Adaptors

The adaptors of which there may be one or more deliver the core services provided by SIBBs in such a way as to maximise the capability, quality and effectiveness of the service. The agent tunes its service output by presenting it through the choice and configuration of adaptors that are most appropriate for the specific access circumstances of the consumer of the services. Adaptors may be atomic or more usually compounded from sets of atomic Adaptors. For example for an AA the adaptor will support the account enquiry service from a mobile telephone or a personal computer by choosing different terminal adaptors. Alternatively, an adaptor might "tune" service provision to a user in relation to other constraints such as the language in which a service session should appropriately be conducted for that user. Embodiments of the present invention achieve their adaptability at least in part through the flexible agent construction using adaptors.

Service Features

It has been stated that an important aspect of the information services infrastructure is the service provision for users by the information retailer. According to embodiments of the present invention, the implementation of the service provisioning supplied by the retailer will generally confer a minimum number of capabilities for the benefit of users. These capabilities might include:

1. submit identifiers for the chosen usage context and undergo authentication, (Authenticate).

Authenticate gives protection to users by giving various levels of security against unauthorised service use or access to information. For example, end-users have protection from violation of privacy, subscribers from fraudulent use of subscriptions, retailer and service provider from unauthorised access to sensitive management functions and information relating to services sessions;

2. enquire of the retailer the content and specifications of services sold, (Enquire).

End-users, subscribers, buyers benefit from this facility because they may search more effectively for services that can provide the required service content. Also retailers and providers can more advantageously advertise their service offerings to interested customers;

3. invoke and use any permitted service to a specified quality and negotiated cost, (Use).

This facility benefits all users by invoking the services required in a way most appropriate for their access circumstances, personal preferences, usage permissions and usage constraints, and guards against conflict between service sessions. For example an end-user may invoke a service only under circumstances that are permitted by a subscription (thus enforcing the contract between retailer and subscriber). When used, the service is personalised to the end-user's declared preferences and optimised by appropriate configuration for the end-user's usage context;

4. view services available for use and associated information such as usage permissions and constraints (View services).

The view facility confers advantages to the user by showing information such as capabilities and constraints of the services which they can use; for example restricted film categories in a video on demand service, 5. view service history, such as usage record and accrued charges, (View charges).

The advantage of this facility is that users may, if permitted, see the historical use made of services and associated charges. For example, a subscriber can monitor itemised billing for specific end-users in order that the subscription can be administered effectively. An end-user could benefit from being able to monitor for unauthorised use of their identity;

6. enter a financial transaction to pay subscription and bills, (Pay charges).

The payment capability benefits anonymous users, subscribers and the retailer by providing a financial settlement mechanism. Several alternative means may be implemented, such as credit card transaction, currency submission acceptance, electronic tokens and direct banking instructions;

7. request assistance and help on any aspect of the retail environment, (Assistance).

Immediate access to help on use of services and facilities is of great advantage to all users to give reassurance and aid the most effective performance of tasks. Furthermore the retailer and provider benefit from empowering users to make the most of the facilities;

8. view and change user personalised preferences for each subscribed service, (Set profile).

It is the user profile that customises the service offerings to individual users and empowers users to tailor each service to their changing requirements. For example the end-user may specify a delivery destination specific to each service or aspects such as look-and-feel on a graphical user interface.

9. negotiate and set-up a new subscription or change the characteristics of an existing subscription such as the permissions of different users in an organisation (Subscribe).

The facility for subscription gives advantages to the retailer and subscriber in the ability to arrange a contract efficiently and quickly. End-users benefit from rapid availability of services.

It is the availability of these facilities optimised for different access circumstances of the user that gives commercial attractiveness of the retail products to customers. Preferably, these facilities are implemented using the intelligent agent components described above.

AA Specialisations

The set of facilities described above shows the set available in the general case. However, the way the agent components (coordinator, adaptors and SIBBS) are chosen and configured to implement these facilities is specific to the user type. For example an employee end-user of a corporate subscription has different needs from a domestic subscriber arranging services for a family. The present invention in part achieves customisation for user types through a number of AA specialisations that are directed at the needs of specific user types. Each specialisation is a reusable combination of components that satisfy the AA needs of each user type. AA specialisation is further customised when the usage context are established.

Figure 2:
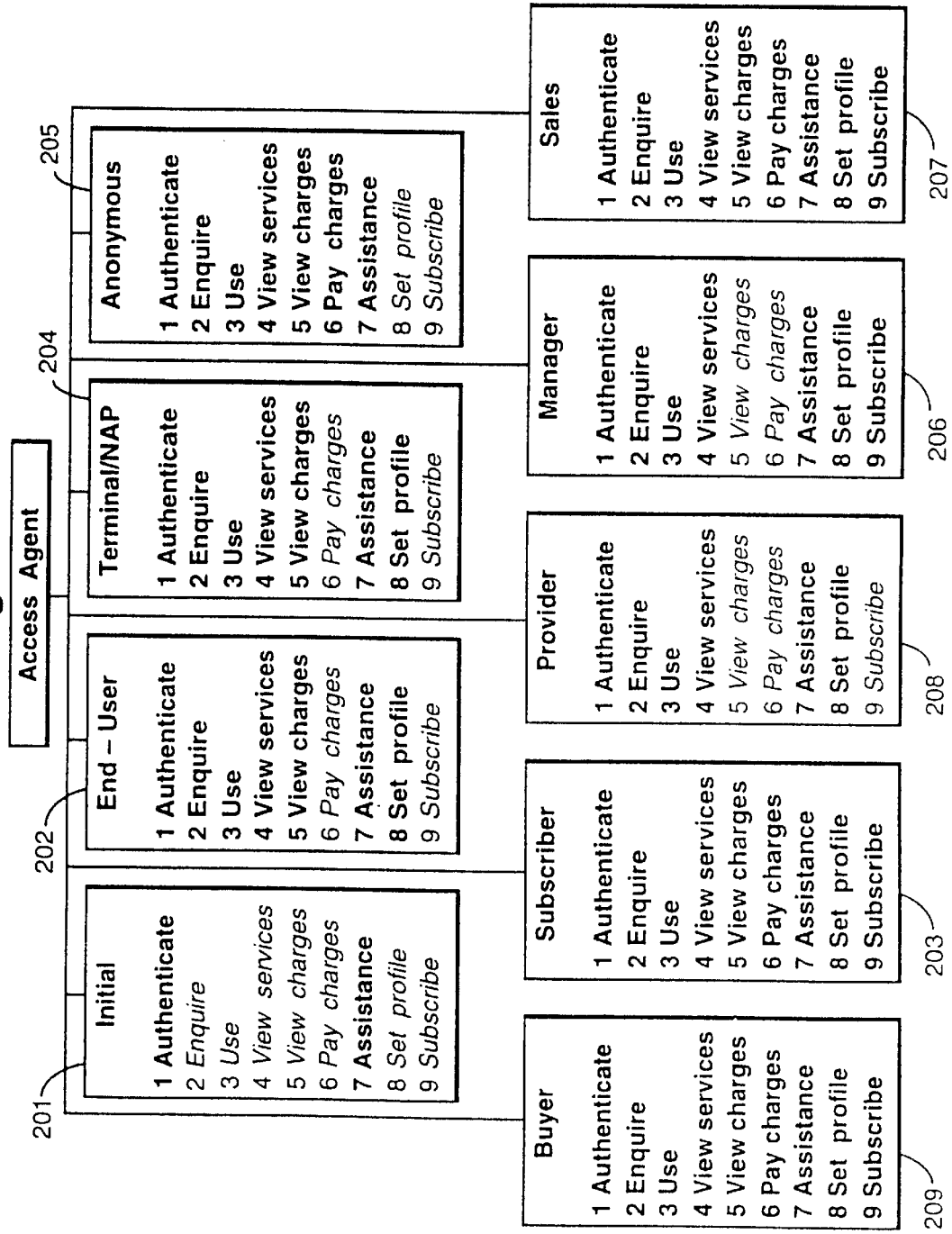
FIG. 2 shows different configurations which might be taken up by an access agent in a system as shown in FIG. 1.

These sets are shown in FIG. 2 where the capabilities in italics are not available in that Agent specialisation. The facilities common to different specialisations operate differently according to the role of the user. For example a service manager expects the facilities to operate differently to an end-user. However, a user may change the usage context at any time by submitting different usage context identifiers for authentication, for example by entering a different username and password. It is implicit that an identified user has an authority level that may affect the privileges offered by each facility to which the user has access. Such privileges are held in the user profile and can usually only be changed by other users granted responsibility and privileges to make such changes. This would be the case for a user administrator for a corporate subscription.

A presentation of any of the agents is the default version set by the service retailer. This appears unless data in the user profile has been customised by the user. Profile customisation is provided by the Set Profile facility that may incur charges. For example, the end-user, sales and terminal/NAP agents can show advertising by default and a user preference to prevent advertising can carry a charge to the user.

Referring to FIG. 2, the AA agent sets can be as follows:

Initial Agent 201

The agent normally encountered when a user or terminal accesses the service retailer domain. It will give access to facilities the retailer chooses to supply without user identifiers being submitted. The only facilities available might be Authenticate and Assistance, for example to contact emergency medical help. In the case of simple voice telephony this agent is analogous to soft-dial tone.

End-User Agent 202

The agent employed when the user has submitted user identifiers that the retailer has authenticated as an end-user of one or more existing subscriptions. This agent will provide the identified end-user with the personal service set derived from subscriptions that grant the end-user privileges. The facilities Enquire, Use, View Services and Set Profile are restricted to the service subscriptions covering the end-user. The Assistance facility supports the activities of end-user. View charges shows only those aspects of service usage and cost that the subscriber (who is paying for the service) has permitted the end-user to see. Set Profile allows customisation of end-user profile data for services but within the constraints of the corresponding subscriptions. Subscribe and pay charges are not possible from this agent.

The end-user agent has particular application to end-users who are not responsible for arranging provision of services, for example children in a household or corporate employees who expect only to use services. An end-user may be identified personally or by the role they are fulfilling within an identified organisations, for example a doctor on-call. (The End-User agent does not necessarily however presume that a user is human)

Subscriber Agent 203

The agent employed when the user has submitted identifiers that the retailer has authenticated as that of the subscriber role. This agent gives the subscriber capabilities to administer subscriptions that grant service access to nominated end-users, terminals or network access points. Enquire helps the subscriber find any retailer service that may be purchased by the subscriber, according to the search criteria submitted. Use allows limited invocation for the purpose of trialing or testing the services on sale. View Services, View Charges and Pay Charges act upon purchased subscriptions. Set Profile allows the subscriber to set mandatory or optional defaults in the profiles of the end-users, terminals or NAPS that are covered by the subscriptions. Assistance supports the activities of subscribers.

The subscriber agent is of particular use for corporate subscriptions where the subscriber (the purchaser) may appoint service administrators to manage the subscriptions for corporate employees who are the end-users.

Terminal and/or Network Access Point (NAP) Agent 204

The agent employed when the terminal and/or network access point to which the terminal is connected have submitted identifiers that the retailer has authenticated as a terminal and/or network access point covered by an existing subscription. This specialisation is similar to the end-User Agent. The profile data does not presume a human user. An example use of this agent is a subscription that covers a mobile phone but not any of the human users carrying it. Another example is for a videophone connected to a fixed NAP to which any office personnel have access. Subscribe and pay charges are not possible from this agent.

Anonymous Agent 205

The agent employed when the user intends to remain anonymous by not submitting any identification. This agent will make free services available where identification is not necessary but will make chargeable services available when credit or payment guarantees have been supplied by the anonymous user and accepted by the service retailer. An example use of the Anonymous Agent is an anonymous call from a public communication point where the anonymous user pays at time of service usage by cash or electronic tokens. Enquire finds any retailer service available to an anonymous user, according to the search criteria submitted. Use allows any free service invocation but for chargeable services will first require the pay charges facility to accept payment guarantees. Some services are provided on a browse basis which will allow the user to sample service content or advertising without payment. The user may choose to invoke and consequently pay for chargeable service usage as appropriate. Assistance supports the activities of anonymous users. Subscribe and Set Profile are not possible from this agent.

Management Agent 206

The agent employed by a user acting in the role of service manager asking on behalf of the service retailer. Managers have access to sensitive service management activities that the retailer wants to perform. An example is the termination of a faulty service session or fraud audit on a service session. The authentication required to identify a service manager is stronger than for other users and may require extra steps and code in the authenticator. Enquire, Use and View Services relate to the services to which the manager has been granted manager privileges. Use invokes the management facilities on services which may include viewing the audit log of a user which contains the history of service usage. Set Profile allows customisation of manager profile data. Assistance supports the activities of retail managers. Subscribe allows a manager to change the management services and facilities available, including granting privileges to other managers with less authority. Pay Charges and View charges are not possible from this agent.

Sales Agent 207

This agent is assigned to users identified to be acting as potential subscribers or end-users in order that they may assess service specifications, performance, retailer facilities and other factors that might influence a purchasing decision. The main purpose of the agent is to sell retail services. Enquire finds any retailer service according to the search criteria submitted. Use allows authorised invocations for the purpose of trialing, testing and using the services on sale. Subscribe takes the potential purchaser through the subscription process which includes submitting payment guarantees, for example credit checks. Assistance supports the activities of potential purchasers. View Charges, Pay Charges and Set Profile are also possible from this agent.

This agent finds particular application in domestic or small businesses where the end-user may also be the subscriber.

Provider Agent 208

This agent is used by the service provider to access management aspects of service logic or content that are the responsibility of the service provider. For example, a Service Provider may want to update or change library information contained by a video-on-demand service. The strength of authentication is stronger than for most other users and may require extra steps and code in the authenticator. Enquire, Use and View Services facilities operate on the services to which Provider privilege has been granted. Use allows the provider to invoke the service functions required for provider management of the service. Set Profile allows customisation of provider profile data. Assistance supports the activities of provider managers. View Charges, Pay Charges and Subscribe are not possible from this agent.

Buyer Agent 209

This agent is used by retailer representatives to negotiate wholesale service provision contracts with providers of service components and network capabilities for inclusion into other services. The strength of authentication is stronger than for most other users and may require extra steps and code in the authenticator. Use services is not possible from this agent.

Reconfiguration

Reconfiguration from one agent set to another can be done, for any one object, by using a policy which relates to context. However, this is relatively complex. Alternatively, the same object can be used but with different policies, or a new object can be introduced. The second two processes will be controlled by the coordinator.

For instance, using a policy which relates to context, if the Access Agent is to reconfigure from the Initial Agent 201 to the Subscriber Agent 208, then the Authenticate functionality will still be needed but will need to be strengthened. This might be done by using a policy which sets out:

"If service requires authentification, then offer a first level of authentification unless the usage context shows user requested any of (End User, Terminal, Anonymous, Subscriber, Sales)-specific functionality, in which case offer a second level of authentification".

In an example of using different policies with an object, in reconfiguring from the Anonymous Agent 205 to the End-User Agent 202, the Locator SIBB will need new policies because the set of service resources to be located will be different in each case.

In an example of introducing a new object, in going from the initial Agent 201 to the Provider Agent 208, the new object "Enquire" will need to be added to the set.

AA Components

Figure 4:
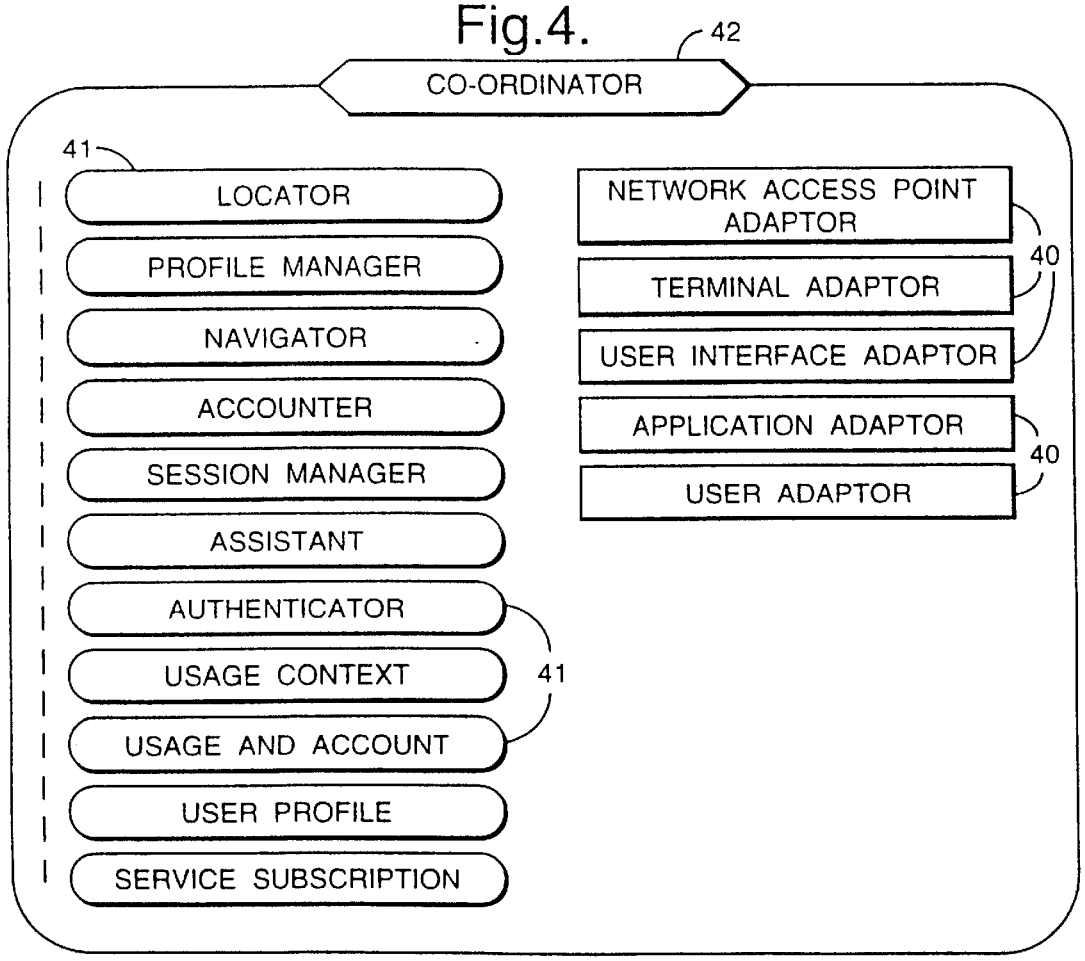
FIG. 4 shows a specific set of objects for use in a "Sales Agent" configuration of an intelligent software agent of the system of FIG. 1.

Referring to FIG. 4, this shows specific adaptors and SIBBs of the AA in its Sales Agent configuration. That is, it shows a set of specific Sales Agent components which will fulfil all the service provisions of the Sales Agent to a high level of functionality.

The co-ordinator is responsible for the selection and inter-working of AA components and manages the interfaces through which communication with the AA can be initiated. When the context of this communication is established by the coordinator it may pass on interface references so that AA components and external objects can communicate directly. The coordinator is responsible for receiving the usage context data when a user first accesses the retail facilities. Usage context data contains technical specification of the specific access arrangements employed by the user, includes user identifiers submitted for authentication (or specifies the absence thereof), and contains information on the purpose for which the user is accessing the system. The usage context data is used by the coordinator to select appropriate adaptors and SIBBs having negotiated with the TA for corresponding allocation of terminal resources to match the adaptors.

The following components are compound SIBBs:

Usage Context holds and manages data that describes all aspects of the current usage context (the user's identity and role) and may include terminal resource specification and identity, NAP specification and identity.

Usage and Account holds and manages data that describes the history of service usage and corresponding usage context, charges incurred, credit limits, charges paid and other data relevant to accounting and usage history.

User Profile holds and manages data that characterises the specific preferences for invoking and receiving services and facilities relevant to the usage context. For example service diversions, or preferred UI look and feel.

Service Subscription holds and manages data specified by the subscriber and retailer that defines the capabilities and constraints of subscriptions that cover the usage context.

Authenticator implements the "authenticate" function which receives identifiers corresponding to any of the user, terminal and network access point and by appropriate tests determines that the identifiers are authentic and being used legitimately. The authenticated usage identifiers are made available to the other SIBBs and adaptors to find the associated data records and self configure appropriately.

Locator performs the function of finding resources that correspond to the subscriptions covering the current usage context. The importance of the locator is that the resource locations are identified so that when services are invoked by the user there is no appreciable delay to the user. Without the locator real-time trading or object request brokering is necessary.

Accounter implements the acquisition and billing of usage and account data submitted from service sessions and prepares a view of this data for the view charges or pay charges facilities.

Profile Manager implements the "subscribe" facility to negotiate the purchase and provision of a service and change subscription details held in the Service Subscription Data. This component maintains and updates User Profile Data when instructed by the user employing the set profile facility. User Profile data contains the information that allows users to customise their preferred default options for services within the constraints of the subscription set by the subscriber and retailer. The View Services facility is implemented in the Profile Manager which uses the usage context and service subscription data to give the user visibility of available services and their constraints or capabilities.

Session Manager is responsible for all aspects of invoking and managing concurrent service sessions according to subscription permissions and implements the use facility. Session management includes the ability to monitor resource usage and guard against adverse resource or service interactions. For example the session manager is responsible for managing the conflict between a videophone incall when the user has all the terminal resources currently occupied with a video-on-demand service.

Navigator is responsible for interacting with directories and DPE traders to search for references to resources available from the DPE. Such resources may be a source of a specific information item, for example a video-on-demand title, or a specific service session or service factory. The navigator implements the facility "enquire".

Assistant implements the facility "assistance". A number of implementations are made which include form based problem reporting, hypertext help, and direct videophone to a human assistant deployed on is behalf of the retailer.

The SIBBS User Profile, Usage and Account, Service Subscription and Usage Context are important because they are persistent although may be inactive processes in storage when the agent is not in use. This is not generally true for other SIBBs. These object components hold and manage key data structures for service provisions which provide services to other SIBBs and adaptors.

The following relates to Adaptors:

The Adaptors are self-configuring using data held in the usage context, user profile and service subscription. In this example adaptors are implemented to support heterogeneity of terminals, applications, user interfaces, users and network access points. The following are examples:

The Terminal Adaptor has different versions and configuration to support the difference between terminals based on UNIX and those based on DOS operating systems.

The User Interface Adaptor has versions and configuration that support different, popular user interfaces standards such as X-windows and PC Windows.

The Application Adaptor supports different application types residing on the terminal, for example equivalent multimedia electronic mail products from different manufacturers. This adaptor would also support different versions of software supplied by a supplier.

A NAP Adaptor accommodates the need for a user to access the is service provision from a variety of network access types, such as cellular radio telephone or a high bandwidth fixed point.

The User Adaptor customises the AA to a specific user by reference to information held in the Usage Context and User Profile Data that includes personal information and information about preferences for running a service expressed by the user. For instance, this might include filtering information provided to a non-technical user to exclude technical subject matter.

Example Mode of Operation

Two aspects of a preferred mode of operation will be described. The first aspect is outcall service invocation, where a user requests a multimedia service session. The second aspect is incall delivery where an end-user of an existing service session requests the delivery of some aspect of that service to another end-user, for example the request to join a multimedia conference or delivery of multimedia electronic mail.

Outcall Example

Referring to FIGS. 2, 4, 5, 10 and 11, the preferred mode for an outcall request will now be described by reference to a video on demand service. However, the way the AA 107 establishes the optimum service provision arrangements with the user access arrangements is common to all AA specialisations. In this mode the user would normally have a computer terminal such as a personal computer, or a television with a user interface provided by a set-top-box.

STEP 501: normally the user enters commands into the terminal application 1120 supporting the information retailer environment.

STEP 502: the terminal application 1120 then instructs the TA 102 to request that the AA 107 presents the services and facilities supported from the current combination of terminal and network configuration.

STEP 503: the TA 102 sends a message across the distributed processing environment (DPE) to the AA 107 which would be created or reactivated from storage on a network node in such a way as to consider use of computing resources and quality of service demands. This message from the TA 102 includes information about the usage context.

In this implementation the TA 102 gains information about the network access point by dialogue with the network agents 110, information which can then be used if necessary to establish and optimise the inter-operation of the terminal applications with network resources.

STEP 504: the AA 107 receives the NAP information from the TA 102. Alternatively, in other implementations the information about the network access point may reach the AA 107 direct from the network agents 110 at the request of the TA 102, or at the request of the AA 107.

STEP 505: the usage context is used by the AA 107 to self-configure as an Initial Agent 201.

STEP 506: the AA will negotiate with the TA 102 for the terminal resources it requires to support the proposed configuration 201 of the AA. The AA is able to adapt service provision to the circumstances of the 10 specific user, terminal, application and NAP by employing the appropriate choice and configuration of the AA adaptors 40 shown in FIG. 4. It is the implementation of these components that gives the AA 107 the ability to maximise the effectiveness of service provision and management.

The specialisation of the AA first encountered is the Initial Agent 201. Because of the limited facilities available from this agent it requires only the adaptors 40 for terminal, user-interface and NAP and the SIBBs 41 Authenticator, and Assistant. The user is then in contact with an AA 107 which will give a minimal set of facilities.

STEP 507: this set can be increased or changed by the direct or indirect request of the user, for example by submitting the authentication details. This approach maximises the responsiveness of the service provision to the user and minimises unnecessary consumption of the retailer's processing resources.

STEP 508: the user may now choose to submit usage context, for example in the form of a username and password identifiers, for authorisation by the AA Initial Agent 201. (In another implementation the user identifiers such as username and password submitted for authentication can be sent automatically by the TA 102 when the Initial Agent 201 is first contacted. This is the case when the identifiers are held in a memory device 11 30 on the terminal 1101. This would be the preferred mode when the user has already logged on to a computer terminal.)

In some situations the user may wish to remain anonymous or prefer for a variety of reasons not to have the service usage associated with any particular subscription. In this case the user can use the Anonymous AA 205 by requesting anonymous status via an Authenticate function in other AAs, although usually the choice would be made from the Initial Agent 201.

STEP 509: from any other AA the request for the anonymous AA 205 results in the rebuilding of the anonymous AA by adding, replacing or reconfiguring SIBBS 41 and adaptors 40. For example the anonymous AA request results in reconfiguration of the User adaptor because the anonymous service usage has not been associated with any subscription data or user profile and is therefore set by default. The coordinator 42 can now bring in additional SIBBs 41 such as The Accounter so the user can pay charges and the Navigator so the user can use the Enquire facility.

When the user has provided identification from the Initial Agent 201 that has been authenticated by the retailer, the Initial AA co-ordinator 42 adds in all the SIBBs versions that will change the AA specialisation from an Initial AA to an End-User AA 202. For example the Profile Manager to manage subscription data, Accounter so the end-user can view charges (if permitted by the subscriptions), Session Manager to invoke service sessions and Navigator to provide enquire. Some components may be upgraded or reconfigured by policy changes, for example the Assistant which is present in the Initial Agent but usually in a less functional form. The Profile Manager finds the subscription records relating to the end-user and constructs a view of the available services, their constraints and related user profile.

STEP 510: the services available are now returned from the AA 107 to the TA 102 and presented to the user, for example on a visual display as a set of icons on a graphical user interface or as listed menu options.

STEP 511: a user can now proceed to invoke a service or facility such as the video-on-demand service by selecting the icon corresponding to that service on their terminal's visual display. The AA SIBB component Session Manager is responsible for managing concurrent service sessions and will receive the invocation request and determine how to fulfil this by contacting a SSA identified by the Locator. This results in a message, sent via the DPE, which would include information about how the service presentation should be optimised for the user and subscription, such as the usage context, user profile preferences for the VoD service, constraints in the service subscription (e.g. film category restrictions) and other factors that would be relevant to optimising the service provision such as those described in relation to SSAs 109.

A SSA 109 is able to negotiate and adapt service provision to the access circumstances of the user in an analogous way as the AA—by a co-ordinated inclusion and configuration of appropriate adaptors 40 and SIBBs 41. The SSA 109 negotiates with the TA 102 in order to ensure appropriate software resources such as a video-on-demand application are present or delivered to the terminal 1101 to support the service session. In another implementation the user may directly invoke a video-on-demand application residing on the terminal 1101. In this case the user may not see the retail environment and service menus because the selection of the video-on-demand service could be presumed by the terminal agent and this message would be sent to the access agent accordingly.

The SSA 109 also negotiates with the Network Agent 110 which eventually results in an appropriate connection between the terminal and video service resources so that the user may interact to select a video, control video stream delivery using fast-forward or pause for example, and receive the video stream.

Additionally the service session resources send accounting data to the AA Accounter SIBB component so that service usage can be billed to the subscriber. The subscriber is able to view the charges and arrange payment for the VoD session by using the Subscriber Agent 203.

Incall Example

In the embodiment of the present invention described above, only one Access Agent 107 is shown and described. In practice, an Access Agent can be allocated to each user of the system. In the case of incall to a user, the called user's AA 107' has a key role in delivering the service output.

Figure 5:
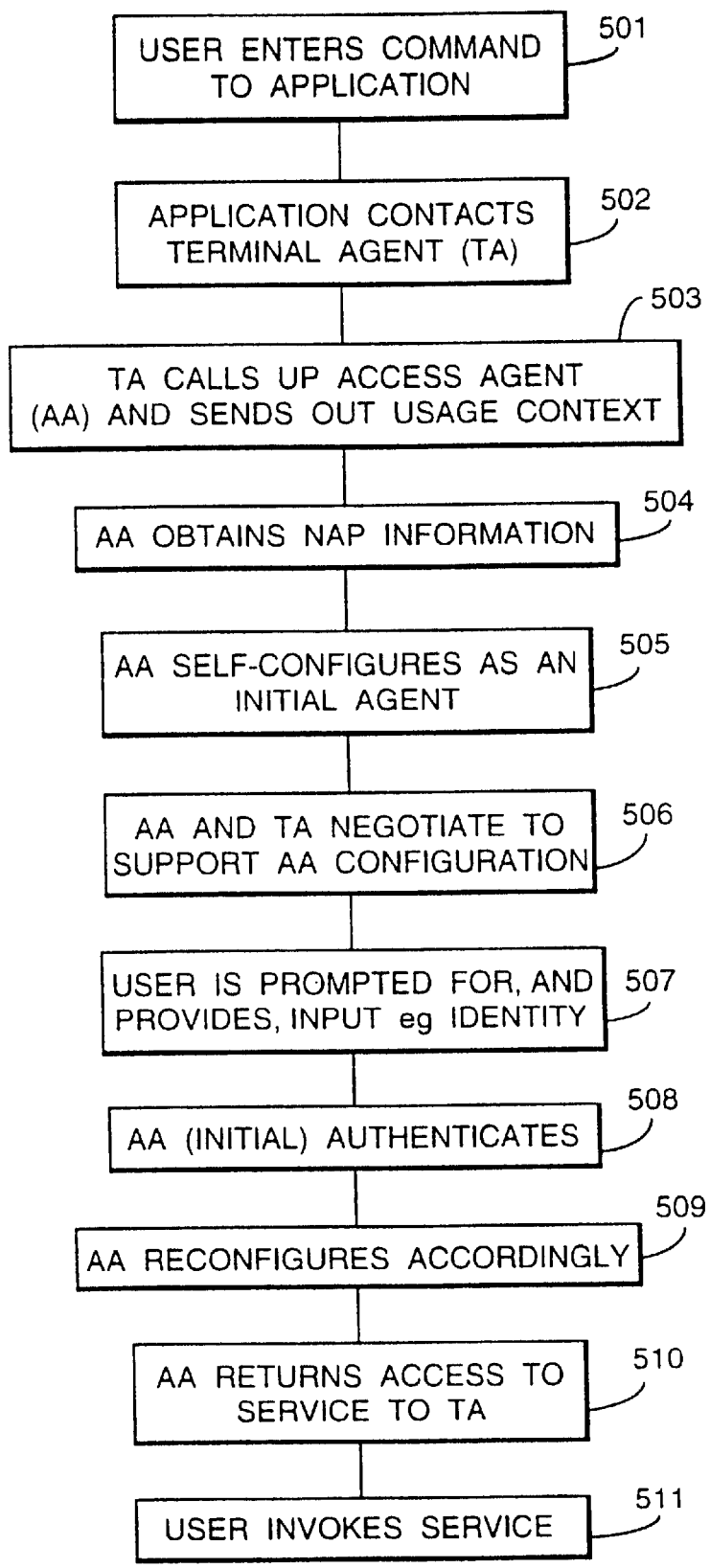
FIG. 5 shows a flow diagram of process steps in use of the system of FIG. 1 to establish an outgoing service session.
Figure 7:
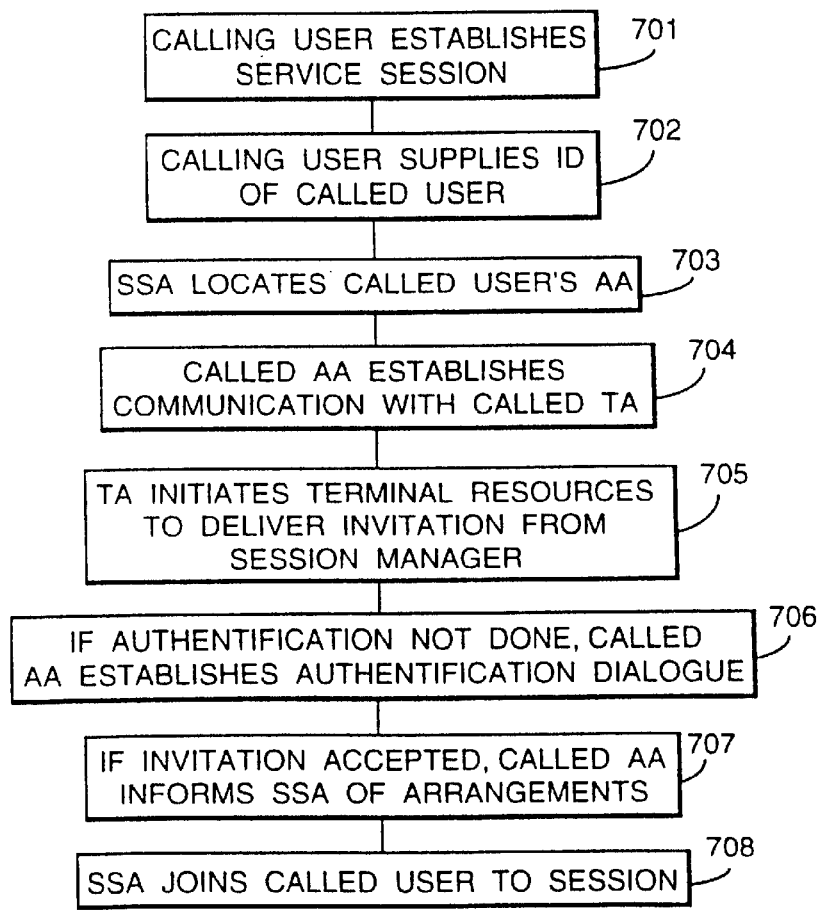
FIG. 7 shows a flow diagram of process steps in use of the system of FIG. 1 to respond to an incoming service session.

Referring to FIG. 7 in place of FIG. 5, the preferred mode of operation is such that the calling user has a service session that requires participation by, or information delivery to, the called user.

STEP 701: the calling user establishes a service session.
STEP 702: the calling user supplies to the Service Session Agent 109 the identity of the called user.
STEP 703: this identity is adequate for the Service Session Agent 109 to find the location of the called user's AA 107', usually with the help of an object request broker.

Because the AA 107' has the responsibility of delivering services it maintains user profile information about how the called user wants that particular service to be delivered. This information will have been registered during earlier interaction between the called user (or terminal only where registration is automatic) and the Set Profile facility of the Profile Manager SIBB component of the AA 107'. For example, if the service was multimedia electronic mail the called user might want this delivered to an electronic letterbox, or in the case of a multimedia conference invitation the incall might be delivered to the called user's multimedia terminal in a business office.

STEP 704: in the case of a multimedia conference service the called AA SIBB component Session Manager using incall completion instructions held in the User Profile Data establishes communication with the called TA 102'.
STEP 705: in the preferred operation the terminal agent 102' is able to initiate appropriate terminal resources such as the multimedia conference application to deliver the conference invitation sent by the Session Manager.
STEP 706: the called AA 107' may request an authentication dialogue with the user if this was not automatically done by the TA when communicating with the AA. Such a dialogue may require that the AA adaptors and TA have optimised their interaction capability.
STEP 707: if the called user accepts the invitation then the called AA 107' is responsible for telling the Service Session Agent 109 the arrangements that the called user will be employing to participate or receive from the service session. This includes the usage context.
STEP 708: the result is that the SSA 109 would join the called user to the multimedia conference session resources giving the called user the optimised service provision for the user's access circumstances within the management policies of the retailer.

Figure 6:
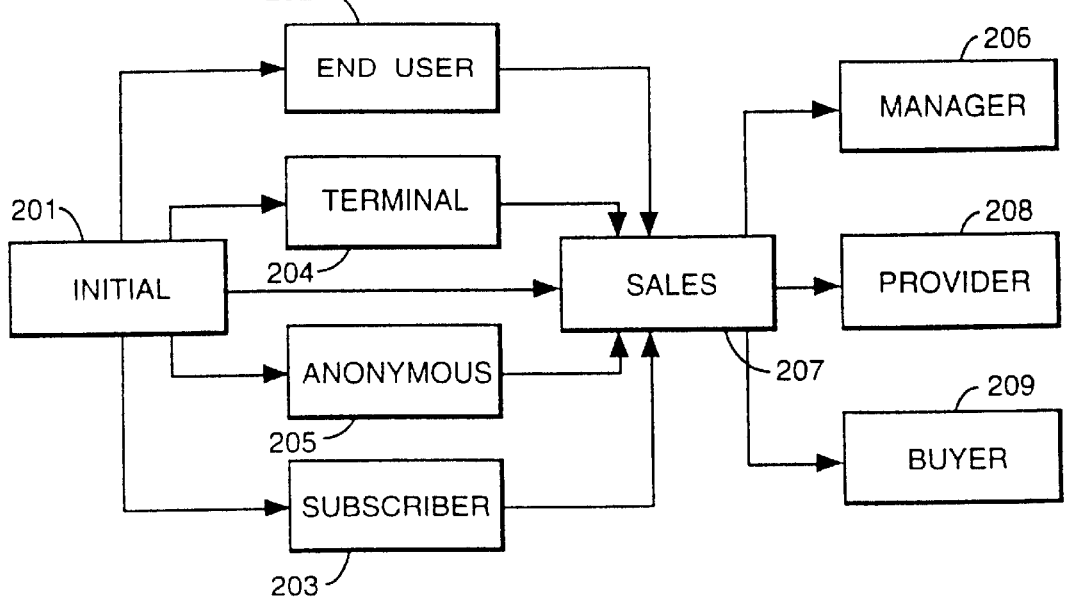
FIG. 6 shows allowable transitions between agent configurations in use of a system as shown in FIG. 1.

In embodiments of the present invention, it is advantageous that an entity accessing the system can input data causing the reconfigurable software agent to make a transition between configurations. Referring to FIG. 6, it may however be preferable to limit the transitions which are available. As shown in FIG. 6, configurations may be ranked for instance according to the level of authentification required. The Initial Agent configuration 201 will often have a low level of authentification since this agent simply provides the means for a user to kick off use of the service provision system. The End-User Agent 202 requires a higher level of authentification, since an authenticated end user is potentially capable of incurring charges but could not for instance trigger the provision of new services (Sales Agent 207) or alter charging rates (Manager Agent 206). By ranking the configurations, so that multiple authentification steps have to be gone through to reach Agent configurations with increasing management functionality, additional protection against significant fraudulent use of the system is provided. By actually barring some transitions altogether, such as between the Anonymous Agent 205 and any of the Buyer 209, Provider 208 and Manager 206 Agents, protection can also be improved.

As shown in FIG. 6, the Sales Agent 207 can provide a reasonable "buffer" between configurations of low functionality and high functionality.

Although the specific embodiment described above shows an infrastructure arranged in four domains, there may be a different number of domains. For instance, the Service Retailer and Service Provider domains 103,104 might be "coalesced".

The Access Agent 107 is used as an example in the description above of an agent's functionality and structure. Each of the other agents associated with domains, the Network, Terminal and Service Session Agents 106,101, 109, might have the same general structure, based on SIBBs, Adaptors and a Co-ordinator. The objects themselves, for instance the SIBBs, will of course need to be different however.

Although inventive features of embodiments of the present invention are set out in the claims, the following paragraphs also set out inventive concepts.

A communications service provision system for providing any one or more of a set of communications services to a user, in response to a user request, by means of a communications network, the system comprising i) an input for user requests ii) a plurality of software entities, each having data processing capability, a datastore or access to a data store, and communications capability for communicating with others of said plurality of software entities for use in initiating provision of a service over said network to a user, and at least one of said software entities having a control output for signals for said initiation wherein the system has means responsive to a user request to enable one of said software entities for response to inputs, the enabled software entity having a default set of capabilities, the default set including a reconfiguration capability in response to further inputs to the enabled software entity.

A system as above, wherein the capabilities of the enabled software entity are determined at least in part by data structures loaded in the software entity.

A system as above, wherein the enabled software entity has access to a datastore for storing said data structures, and the reconfiguration capability comprises modification of the set of data structures loaded in the software entity.

A system as above, wherein the software entities are installed on communications nodes, either on the same or different nodes, which nodes are provided with a distributed computing environment for communication between the software entities.

A system as above, wherein communications between software entities installed on different nodes are carried by the communications network for providing services to a user, according to a distributed processing environment protocol stack established by said environment at each node.

A system as above, wherein the enabled software entity initiates provision of a service by making transitions between different sets of capabilities, and wherein transitions between one or more selected pairs of these sets are barred.

A method of providing one or more communications services to a user by means of a communications network, which method comprises the steps of i) enabling a software entity, in a community of software entities which together are capable of initiating service provision to the user, to respond to a first user input, ii) in response to a further user input, reconfiguring the enabled software entity so as to change its capabilities, said reconfiguration being carried out by modifying a set of data structures loaded in the software entity.

A method as above which further comprises storing a set of data structures, selectively accessible by the enabled software entity so as to provide said reconfiguration.

What is claimed is:

1. A service provision system, for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services; and wherein said reconfigurable agent is provided with means to select a set of software modules from said plurality of different software modules, in response to user information received at the input, and to invoke and run the executable code provided by said selected set, each software module comprising at least one process step with one or more associated rules, the behavior of the system in use being determined at least in part by the outcome of application of said one or more associated rules in the process step, and at least one of said one or more associated rules being external to the software modules and being loaded in a relevant module when that module is run during use of the system.

2. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

wherein said reconfigurable agent is provided with means to select a set of software modules from said plurality of different software modules, in response to user information received at the input, and to invoke and run the executable code provided by said selected set; and wherein the reconfigurable agent adopts a first configuration in response to a user initiating use of the system, by selecting an initial set of software modules, and reconfigures to a second configuration on receiving data associated with the user, by selecting a subsequent set of software modules.

3. A service provision system according to claim 1 wherein the reconfigurable software agent is provided with an available set of software modules and adopts a reconfiguration at least partly by selecting modules from the set to make available to run in use of the system and which further comprises means for changing the available set of software modules for the purpose of upgrading or modifying the service provision system.

4. A service provision system according to claim 1 wherein at least one associated rule is reusable between software modules in that it can be loaded with respect to more than one software module when the respective modules are run during use of the system.

5. A service provision system according to claim 1 wherein: a group of the software modules provide service-independent building blocks in support of services to be provided by the system.

6. A service provision system according to claim 1 wherein:

at least one of the software modules provides adaptation of the service provision system to operating constraints and/or capabilities relevant to usage of the system by a user.

7. A service provision on system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

wherein said reconfigurable agent is provided with means to select a set of software modules from said plurality of different software modules, in response to user information received at the input, and to invoke and run the executable code provided by said selected set; and wherein the reconfigurable software agent comprises, or has access to, a plurality of software modules, each software module being provided with a data structure and associated functionality, at least some of the different configurations of the agent incorporating different respective sets of modules selected from said plurality, at least one of the software modules providing adaptation of the service provision system to operating constraints and/or capabilities relevant to usage of the system by a user; and wherein said adaptation of the service provision system is in response to real-time operating constraints and/or capabilities relevant to usage of the system by a user.

8. A service provision system according to claim 7 wherein said adaptation is in respect of language.

9. A service provision system according to claim 6 wherein said adaptation is in respect of a filter or translator of information provided by the system to the user.

10. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent having an input for user information and comprises, or has access to, a plurality of different software modules which provide executable code to the agent for user in providing access to services, at least two configurations of the agent incorporating different respective sets of modules selected from said plurality, wherein at least one of the software modules provides selection and/or modification of other software modules of said plurality between different configurations of the agent.

11. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

wherein said reconfigurable agent is provided with means to select a set of software modules from said plurality of different software modules, in response to user information received at the input, and to invoke and run the executable code provided by said selected set; and wherein the reconfigurable software agent comprises, or has access to, a plurality of software modules, each software module being provided with a data structure and associated functionality, at least some of the different configurations of the agent incorporating different respective sets of modules selected from said plurality, at least one of the software modules providing selection and/or modification of other software modules of said plurality between different configurations of the agent; and wherein at least one of said plurality of software modules provides a conflict resolution process for use in resolving conflicts between requirements of software modules of the same selected set.

12. A service provision system according to claim 10, wherein each software module comprises at least one process step with one or more associated rules, the behaviour of the system in use being determined at least in part by the outcome of application of said one or more associated rules in the process step: and said modification of the software modules between configurations is provided at least in part by modification or substitution of one or more associated rules of a process step.

13. A service provision system according to claim 10 wherein each software module comprises at least one process step with one or more associated rules, the behaviour of the system in use being determined at least in part by the outcome of application of said one or more associated rules in the process step: and said modification of the software modules between configurations is provided at least in part by addition or subtraction of one or more rules to or from the associated rules of a process step.

14. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

wherein said reconfigurable agent is provided with means to select a set of software modules from said plurality of different software modules, in response to user information received at the input, and to invoke and run the executable code provided by said selected set; and wherein the reconfigurable software agent comprises, or has access to, a plurality of software modules, each software module being provided with a data structure and associated functionality, at least some of the different configurations of the agent incorporating different respective sets of modules selected from said plurality, at least one software module of the plurality providing conflict resolution functionality for use in co-ordinating presence of other software modules in a selected set.

15. A service provision system according to claim 1 wherein data input to the system in use, by a user, comprises calling entity identification data, identifying a calling entity accessing the system, and the configuration adopted by the reconfigurable software agent is determined at least in part by reference to the calling identity identification data.

16. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

at least some of the different configurations of the agent incorporating different respective sets of modules selected from said plurality, wherein data input to the system in use, by a user, excludes calling entity identification data, identifying a calling entity accessing the system, and the configuration adopted by the reconfigurable software agent determines that the functionality of the system includes means for providing cost data to the calling entity in advance of service provision by means of the system.

17. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

at least some of the different configurations of the agent incorporating different respective sets of modules selected from said plurality, wherein the configuration adopted by the reconfigurable software agent determines that the functionality of the system includes means for accepting payment data from the calling entity in advance of service provision by means of the system.

18. A service provision system according to claim 1 wherein the system comprises at least two reconfigurable intelligent software agents, each reconfigurable agent being associated with a respective user of the system.

19. A service provision system according to claim 1 wherein the intelligent software agents are constructed according to object-oriented technology.

20. A service provision system according to claim 1 wherein services made available by use of the system are information services.

21. A service provision system for providing services to a user by means of one or more communications network(s), wherein the service provision system comprises intelligent software agents in a computing environment, which agents co-operate to provide access to services for a system user by invoking and running executable code, wherein at least one agent is a reconfigurable agent and comprises an input for user information, and further comprises or has access to a plurality of different software modules which provide executable code to the agent for use in providing access to services;

wherein said reconfigurable agent is provided with means to select a set of software modules from said plurality of different software modules, in response to user information received at the input, and to invoke and run the executable code provided by said selected set; and wherein the reconfigurable agent has a plurality of different configurations available to it, and can reconfigure to make transitions between configurations of said plurality, during use of the system, direct transitions between predetermined pairs of the configurations being unavailable.

22. A service provision system according to claim 1 wherein the reconfigurable agent can adopt either one of a first and a second configuration, the first configuration providing a low level of functionality only and the second configuration providing a higher level of functionality, the second configuration only being selected and loaded for use after a user complies with an authentification step of the first configuration.

23. A service provision system according to claim 22 wherein, in the first configuration, the functionality comprises authentification and assistance only.

24. A service provision system for making information services available by means of one or more communications network(s), and for managing the provision of such services, the service provision system comprising receiving means for receiving a user request for access to functionality provided by the system, data processing means for processing data associated with a user input, and means for making service provision or management functionality available to the user in response to the user request, in accordance with data processed by the processing means, wherein the functionality made available to a user is determined at least in part by data processed by the processing means, the service provision system comprising intelligent software agents in a computing environment, which agents cooperate to support a response to a user request by the system, at least one of the agents being reconfigurable to modify said functionality made available in response to data processed by the processing means, wherein each reconfigurable agent has available to it a plurality of software modules, and wherein the system comprises means to reconfigure each reconfigurable agent by selecting and loading a different set of said plurality of software modules so as to rebuild said agent in a new configuration.

25. A service provision system according to claim 24 wherein at least some of said software modules comprise service independent building blocks.

26. A service provision system according to claim 25 wherein at least one of the agents is provided with data and functionality relevant to service access control.

27. A service provision system according to claim 26 wherein the service access control agent is reconfigurable in response to data associated with a user input to modify access control functionality of the system.

28. A service provision system according to claim 26 wherein the service access control agent is reconfigurable so as to change service management functionality available to the user.

29. Service access apparatus for providing access to communications services to a user in a service provision system according to claim 1, the apparatus itself comprising a said self reconfigurable software agent.

* * * * *